(12) United States Patent
Williams et al.

(10) Patent No.: US 11,003,256 B2
(45) Date of Patent: May 11, 2021

(54) APPARATUS, COMPUTER PROGRAM AND METHOD

(71) Applicant: Sony Corporation, Tokyo (JP)

(72) Inventors: Michael John Williams, Winchester (GB); Paul Edward Prayle, Basingstoke (GB); Michael Goldman, London (GB); William Jack Leathers-Smith, Guildford (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/346,368

(22) PCT Filed: Sep. 12, 2017

(86) PCT No.: PCT/GB2017/052675
§ 371 (c)(1),
(2) Date: Apr. 30, 2019

(87) PCT Pub. No.: WO2018/087512
PCT Pub. Date: May 17, 2018

(65) Prior Publication Data
US 2020/0050288 A1    Feb. 13, 2020

(30) Foreign Application Priority Data

Nov. 11, 2016 (GB) ..................... 1619144

(51) Int. Cl.
*G06F 3/0346* (2013.01)
*G06F 3/01* (2006.01)
(Continued)

(52) U.S. Cl.
CPC .......... *G06F 3/0346* (2013.01); *A63F 13/211* (2014.09); *A63F 13/52* (2014.09);
(Continued)

(58) Field of Classification Search
CPC .......... G06F 3/01; G06F 3/011; G06F 3/0346; G06F 3/012; G06F 3/013; G06F 3/03547;
(Continued)

(56) References Cited

U.S. PATENT DOCUMENTS 9,245,388 B2 *  1/2016  Poulos ............... G02B 27/0172
9,384,594 B2 *  7/2016  Maciocci ............. H04N 9/3173
(Continued)

FOREIGN PATENT DOCUMENTS

GB        2517008 A  *  2/2015  ............. G06F 3/012
GB        2517008 A     2/2015
WO   WO 2016/144622 A1   9/2016

OTHER PUBLICATIONS

International Search Report and Written Opinion dated Jan. 26, 2018 in PCT/GB2017/052675 filed Sep. 12, 2017.
(Continued)

*Primary Examiner* — Sardis F Azongha
(74) *Attorney, Agent, or Firm* — Oblon, McClelland, Maier & Neustadt, L.L.P.

(57) ABSTRACT

An apparatus for generating a graphical representation of a content display in a virtual reality environment, comprising: controller circuitry configured to determine a position of a device relative to a virtual reality headset in the real world, and when the device is at a predetermined position in front of the virtual reality headset, the controller circuitry is further configured to: generate a graphical representation of a content display in the virtual reality environment, the position of the graphical representation in the virtual reality environment being determined by the real world position of the device in front of the virtual reality headset, wherein the size of the graphical representation of a content display is changed in dependence on the position of the distance between the virtual reality headset and the device, wherein, in response to a user input, the controller circuitry is
(Continued)

configured to: lock the position of the graphical representation of the content display in the virtual reality environment and, the controller circuitry is further configured, in response to locking the position, a second graphical representation of the content display is created, wherein the position of the second graphical representation of the content display is determined by the real world position of the device in front of the virtual reality headset.

17 Claims, 18 Drawing Sheets

(51) Int. Cl.
  *G06T 11/00*  (2006.01)
  *G06F 3/0354*  (2013.01)
  *A63F 13/211*  (2014.01)
  *A63F 13/52*  (2014.01)

(52) U.S. Cl.
  CPC .............. *G06F 3/012* (2013.01); *G06F 3/013* (2013.01); *G06F 3/03547* (2013.01); *G06T 11/00* (2013.01); *A63F 2300/105* (2013.01); *A63F 2300/30* (2013.01); *A63F 2300/8082* (2013.01); *G06T 2200/24* (2013.01)

(58) Field of Classification Search
  CPC ...... G02B 27/01; G02B 27/017; G06T 19/00; G06T 19/06; G06T 11/00; A63F 13/211; A63F 13/52; A63F 13/53; A63F 13/537
  See application file for complete search history.

(56) References Cited

U.S. PATENT DOCUMENTS

| | | | | |
|---|---|---|---|---|
| 9,430,038 | B2* | 8/2016 | Ebstyne | G06F 3/011 |
| 9,703,102 | B2* | 7/2017 | Hashiba | G02B 27/0179 |
| 10,173,129 | B2* | 1/2019 | Mikhailov | G09G 3/3413 |
| 10,198,874 | B2* | 2/2019 | Dearman | G06F 3/0383 |
| 10,217,286 | B1* | 2/2019 | Angel | G06F 3/011 |
| 10,324,293 | B2* | 6/2019 | Newman | G02B 27/40 |
| 10,345,925 | B2* | 7/2019 | Du Bois | G06F 3/012 |
| 2006/0284792 | A1 | 12/2006 | Foxlin | |
| 2010/0023878 | A1* | 1/2010 | Douris | H04L 12/6418 715/757 |
| 2011/0007035 | A1 | 1/2011 | Shai | |
| 2012/0229508 | A1 | 9/2012 | Wigdor et al. | |
| 2014/0368537 | A1* | 12/2014 | Salter | G06F 3/011 345/633 |
| 2015/0130705 | A1* | 5/2015 | Im | G06F 3/013 345/156 |
| 2015/0301592 | A1 | 10/2015 | Miller | |
| 2015/0301599 | A1 | 10/2015 | Miller | |
| 2015/0301787 | A1 | 10/2015 | Greco et al. | |
| 2015/0301797 | A1 | 10/2015 | Miller | |
| 2015/0302250 | A1 | 10/2015 | Miller | |
| 2015/0302625 | A1 | 10/2015 | Greco et al. | |
| 2015/0302642 | A1 | 10/2015 | Miller | |
| 2015/0302643 | A1 | 10/2015 | Miller | |
| 2015/0302644 | A1 | 10/2015 | Miller et al. | |
| 2015/0302652 | A1 | 10/2015 | Miller et al. | |
| 2015/0302655 | A1 | 10/2015 | Miller et al. | |
| 2015/0302656 | A1 | 10/2015 | Miller et al. | |
| 2015/0302657 | A1 | 10/2015 | Miller | |
| 2015/0302658 | A1 | 10/2015 | O'Connor et al. | |
| 2015/0302659 | A1 | 10/2015 | O'Connor et al. | |
| 2015/0302660 | A1 | 10/2015 | O'Connor et al. | |
| 2015/0302661 | A1 | 10/2015 | Miller | |
| 2015/0302662 | A1 | 10/2015 | Miller | |
| 2015/0302663 | A1 | 10/2015 | Miller | |
| 2015/0302664 | A1 | 10/2015 | Miller | |
| 2015/0302665 | A1 | 10/2015 | Miller | |
| 2015/0316980 | A1 | 11/2015 | Miller | |
| 2015/0316982 | A1 | 11/2015 | Miller | |
| 2015/0317839 | A1 | 11/2015 | Miller | |
| 2015/0339857 | A1 | 11/2015 | O'Connor et al. | |
| 2015/0352437 | A1* | 12/2015 | Koseki | A63F 13/25 463/31 |
| 2015/0356781 | A1 | 12/2015 | Miller | |
| 2015/0356782 | A1 | 12/2015 | Miller et al. | |
| 2015/0356783 | A1 | 12/2015 | Miller et al. | |
| 2015/0356784 | A1 | 12/2015 | Miller et al. | |
| 2016/0232715 | A1 | 8/2016 | Lee | |
| 2016/0266386 | A1 | 9/2016 | Scott et al. | |
| 2016/0274758 | A1* | 9/2016 | Bailey | G06F 3/0487 |
| 2017/0061688 | A1 | 3/2017 | Miller | |
| 2017/0192499 | A1* | 7/2017 | Trail | G06F 3/013 |

OTHER PUBLICATIONS

Intellectual Property Office Search Report dated Apr. 20, 2017 in GB 1619144.7 filed Nov. 11, 2016.

* cited by examiner

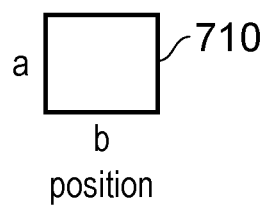
FIG.7A
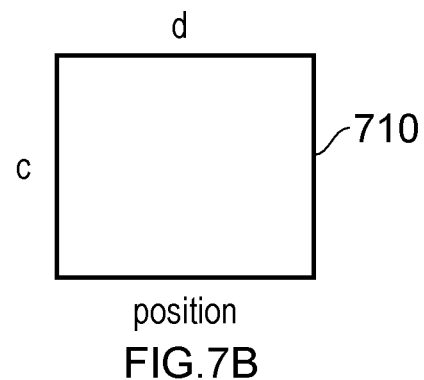
FIG.7B
FIG. 7E

APPARATUS, COMPUTER PROGRAM AND METHOD

BACKGROUND

Field of the Disclosure

The present technique relates to an apparatus, computer program and method.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present technique.

Virtual Reality headsets are being developed. These headsets provide an immersive experience for users and can be used for gaming applications. However, these headsets may also be used in educational and entertainment applications as well.

The entertainment applications include providing an immersive experience in video content. In other words, the user must feel like they are part of the action captured by the video content. However, this has a number of problems associated with it.

Firstly, whilst being immersed in the video content is desirable, users are typically provided with ancillary information associated with the content. For example, when a user watches a live event, it is desirable that the user feels immersed in the event. However, the user must also be able to customise their experience and enjoy other ancillary information associated with the event. An example of this ancillary information is information about the players in the event.

Secondly, where immersed, it is important that the content is delivered in a timely fashion to maintain the feeling of immersion.

It is an aim of embodiments of the disclosure to try and address either one or both of these problems.

SUMMARY

An apparatus for generating a graphical representation of a content display in a virtual reality environment, comprising: controller circuitry configured to determine a position of a device relative to a virtual reality headset in the real world, and when the device is at a predetermined position in front of the virtual reality headset, the controller circuitry is further configured to: generate a graphical representation of a content display in the virtual reality environment, the position of the graphical representation in the virtual reality environment being determined by the real world position of the device in front of the virtual reality headset.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 7A to 7E show a virtual reality environment according to embodiments of the disclosure;

DESCRIPTION OF THE EMBODIMENTS

Figure 1:
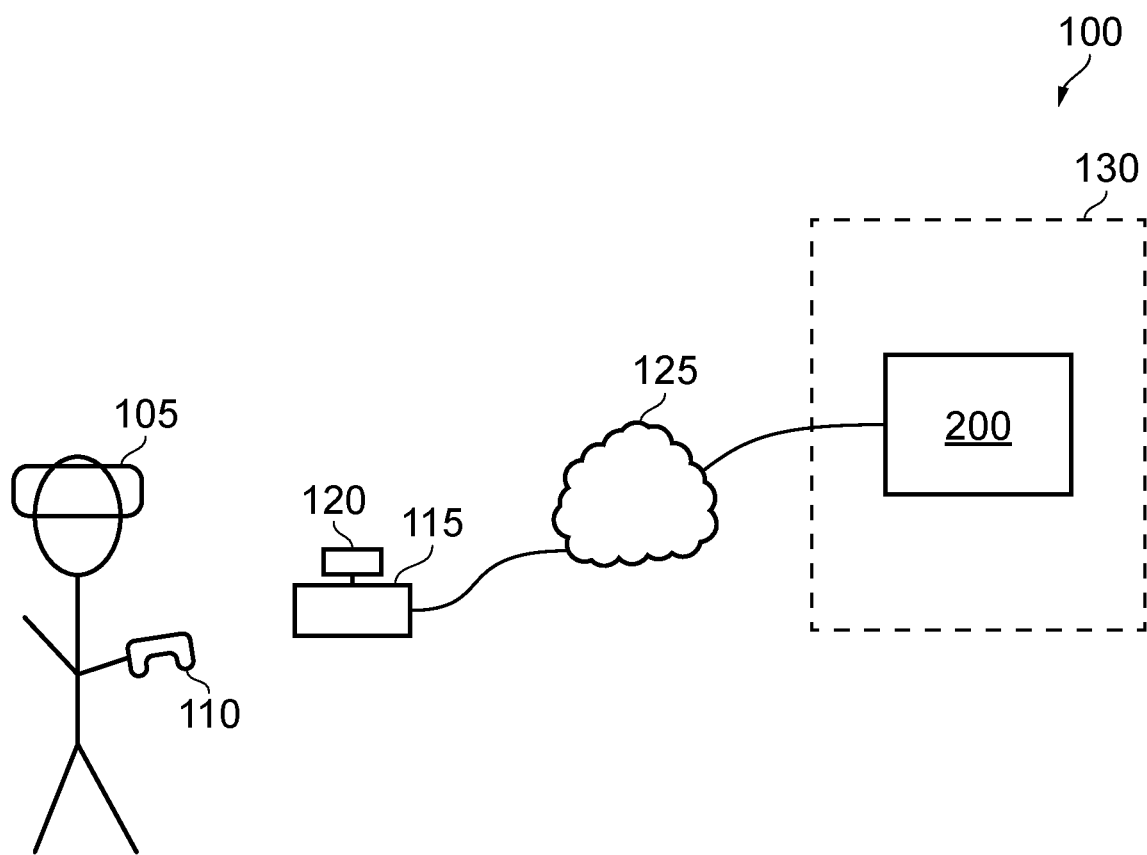
FIG. 1 shows a system 100 according to embodiments of the present disclosure.

Referring now to the drawings, wherein like reference numerals designate identical or corresponding parts throughout the several views.

FIG. 1 shows a system 100 according to embodiments of the disclosure. The system 100 includes a venue 130 which may be a venue for a sports event or a musical event or any kind of event having spectators or attendees. In the following example, the venue 130 is a soccer venue.

Within the venue 130 is located an apparatus 200 according to embodiments of the invention. The apparatus 200 may be permanently located within the venue 130 or may be located there temporarily to cover the event within the venue. Although not shown in the Figure, the apparatus 200 may have other devices attached to it. These may include other devices such as cameras located at various positions within the venue. This will be explained later with reference to FIG. 5.

The apparatus 200 is connected to a network. In embodiments, the apparatus 200 is connected to the internet 125. The internet 125 is an example of a Wide Area Network. However, as will be apparent to the skilled person, the apparatus may be connected to a Local Area Network, or may be connected to a Virtual Private Network.

Also connected to the internet 125 is a PlayStation 4® 115 belonging to a user. The PlayStation 4® 115 (hereinafter referred to as a PS4®) is an example of a games console. However, as will be appreciated by the skilled person, the PS4® 115 may be any kind of device that can be connected to the apparatus 200 either directly or via a network which allows content to be sent to the user.

Attached to the PS4® 115 is a headset detector 120. The headset detector 120 detects the presence of a headset 105. The headset detector 120 also communicates with the headset 105. The position of the headset 105 relative to the headset detector 120 and the orientation of the headset 105 is also detected by the headset detector 120. The headset detector 120 provides the location and orientation information of the headset 105 to the PS4® which renders an appropriate image for the headset 105 to be displayed to the user. An example of the headset detector 120 is a PlayStation camera.

In embodiments, the headset 105 is a PlayStation® VR headset. However, other headsets such as the Oculus Rift® or the HTC Vive® are also examples of a headset. These headsets contain sensors to determine orientation of the headset, a microphone and headphones to provide audio to the user.

Additionally, a control unit 110 is provided. The control unit 110 is used to control the PS4® 115. However, as will be appreciated, the position of the control unit 110 may also be detected by the headset detector 120. An example of the control unit 110 is a DualShock 4 controller.

It should be noted here that the headset detector 120, the headset 105, the PS4® 115, and the control unit 110 are all themselves known. Accordingly, detailed descriptions of each of these devices will not be provided in detail for brevity. However, the application of these devices is the subject of embodiments of the disclosure.

Figure 2:
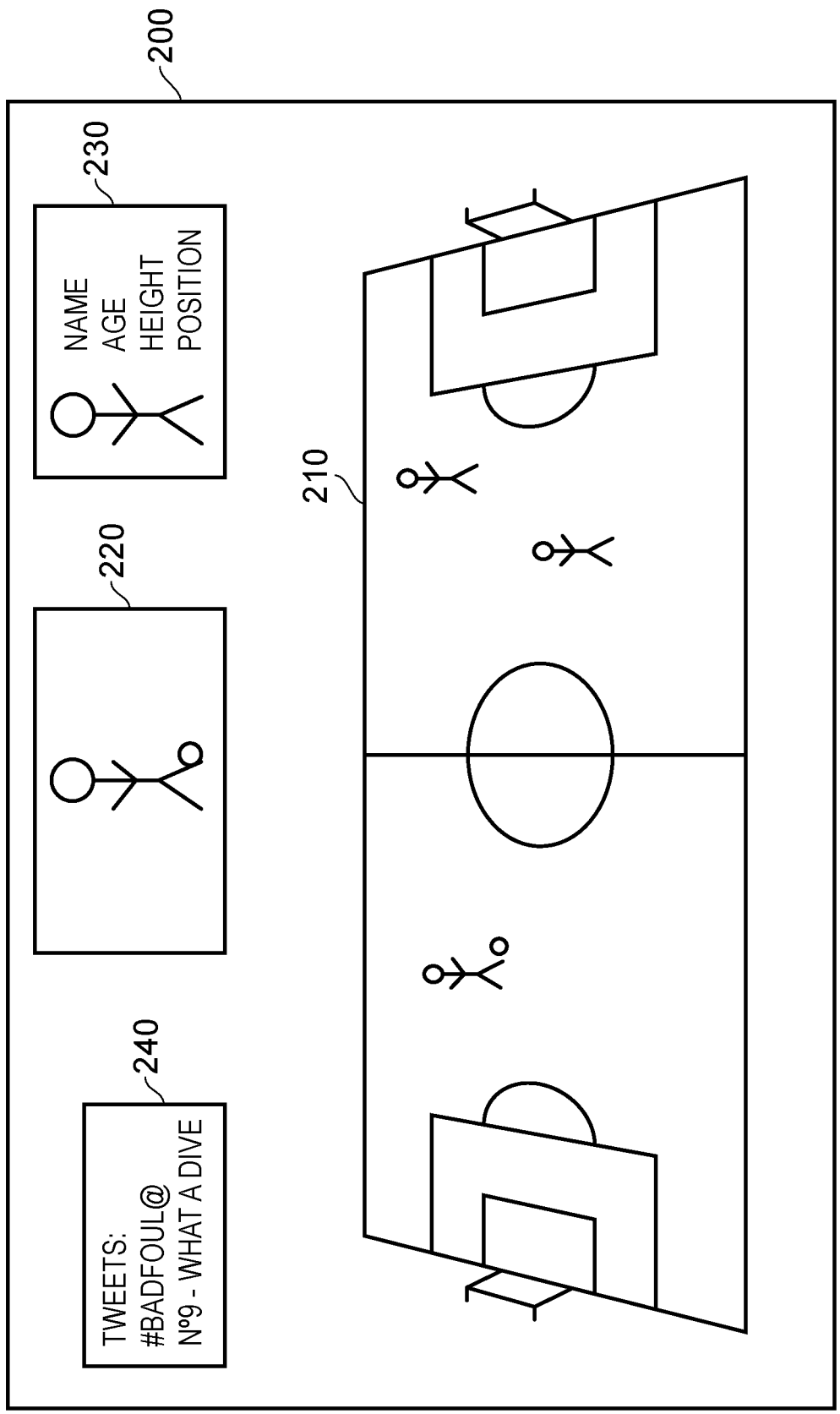
FIG. 2 shows a virtual reality environment 200 according to embodiments of the present disclosure

FIG. 2 shows a view 200 presented to the user of the headset 105. The user view 200 will be presented on the screen located within the headset 105. In the example of a PlayStation® VR, the screen is a 5.7" OLED screen.

Within the user view 200, there is provided a wide angle view of a soccer pitch 210. Specifically, in embodiments, the soccer pitch 210 will be captured by one or more static cameras located within the venue 130. The soccer pitch 210 maybe formed of a single image captured with a wide angle lens or maybe formed of a so called "stitched image". The resolution of the soccer pitch may be any value such as 4K, 8K or any ultra-high resolution image. The stitched image is generated by capturing a scene such as the soccer pitch using a plurality of cameras and stitching the image together using a known technique. This means that a resultant wide angle image of the soccer pitch 210 is provided. As, in non-limiting examples, the static cameras are located in the crowd, the user view of the soccer pitch in the headset 105 is the same as if the user were sat in the crowd at the soccer match. In other words, the soccer pitch 210 is a similar view to the view experienced by the user had the user attended the soccer match in person.

Of course, although embodiments of the disclosure relate to a soccer match, the disclosure is no way limited to this. For example, the event may be a tennis match, motor racing (such as Formula 1 racing), American Football, Rugby, Golf or the like. Indeed, any non-sporting events such as music concerts as also envisaged as appropriate events.

It should be noted here that although a static image of the soccer pitch 210 is shown, the skilled person will appreciate that the user's view within the image may be changed. In other words, as the user moves the headset 105, the headset detector 120 detects this movement and alters the view presented to the user on the headset 105. The mechanism for changing the user's view within the image as the headset 105 moves is known and will not be explained for brevity.

Additionally presented in the user's field of view 200 are a first screen 230, second screen 220, and a third screen 240. Specifically, in embodiments, an information screen 230 is one example of the first screen, a broadcast screen 220 is an example of the second screen, and a social media screen 240 is an example of the third screen. Of course, the size and number of screens as well as the content within the screens may be varied and are in no way limited to this described configuration as will be appreciated.

The information screen 230 provides details of a particular player on the pitch. The information included in the information screen may be the name of the player, his or her age, the height of the player and the position in which the player plays. The user of the headset 105 may select the player for which the information is provided or the user may cycle through one or both teams playing in the soccer match. Of course, the information screen may include any information such as the recent performance of a particular team playing on the pitch or even live scores of other fixtures played at the same time as that displayed to the user or a live updated soccer league table.

In the broadcast screen 220, there is displayed the soccer match that is currently being televised. In other words, the broadcast screen 220 shows the television output currently being broadcast to viewers at home. The broadcast screen 220 may be captured using a different camera within the stadium to that capturing the wide angle view of the pitch. However, the disclosure is not so limited and the content on the broadcast screen may be a cut out of the ultra-high definition wide angle view of the soccer pitch 210. A technique for forming the cut-out is provided in GB2512680A, the content of which is hereby incorporated by reference.

Additionally shown in FIG. 2 is a social media screen 240. This screen displays social media content provided by Facebook® or Twitter® or Instagram® or Snapchat.® or the like The social media feed may be selected based on certain hashtags inserted into the social media content, or may be the social media feed provided by a certain individual or company. The social media feed may also change depending on the player or team currently displayed on the information screen. For example, if the information screen 230 is showing statistics for Cristiano Ronaldo, the social media feed may display hashtags associated with that player (such as #ronaldo or @cristiano or the like). If the player displayed on the information screen 230 changes, then the social media feed will change to the new player.

Of course, the feed of the social media content may be static. For example, if the user is a fan of Newcastle United Football Club, the social media feed may only show the Twitter feed of Newcastle United (@NUFC).

It should be noted that the position of the first screen, second screen and third screen may be defined by the user using an embodiment of the disclosure or may be positioned by default in fixed locations which do not, for example, occlude the displayed view of the soccer pitch 210.

Figure 3A:
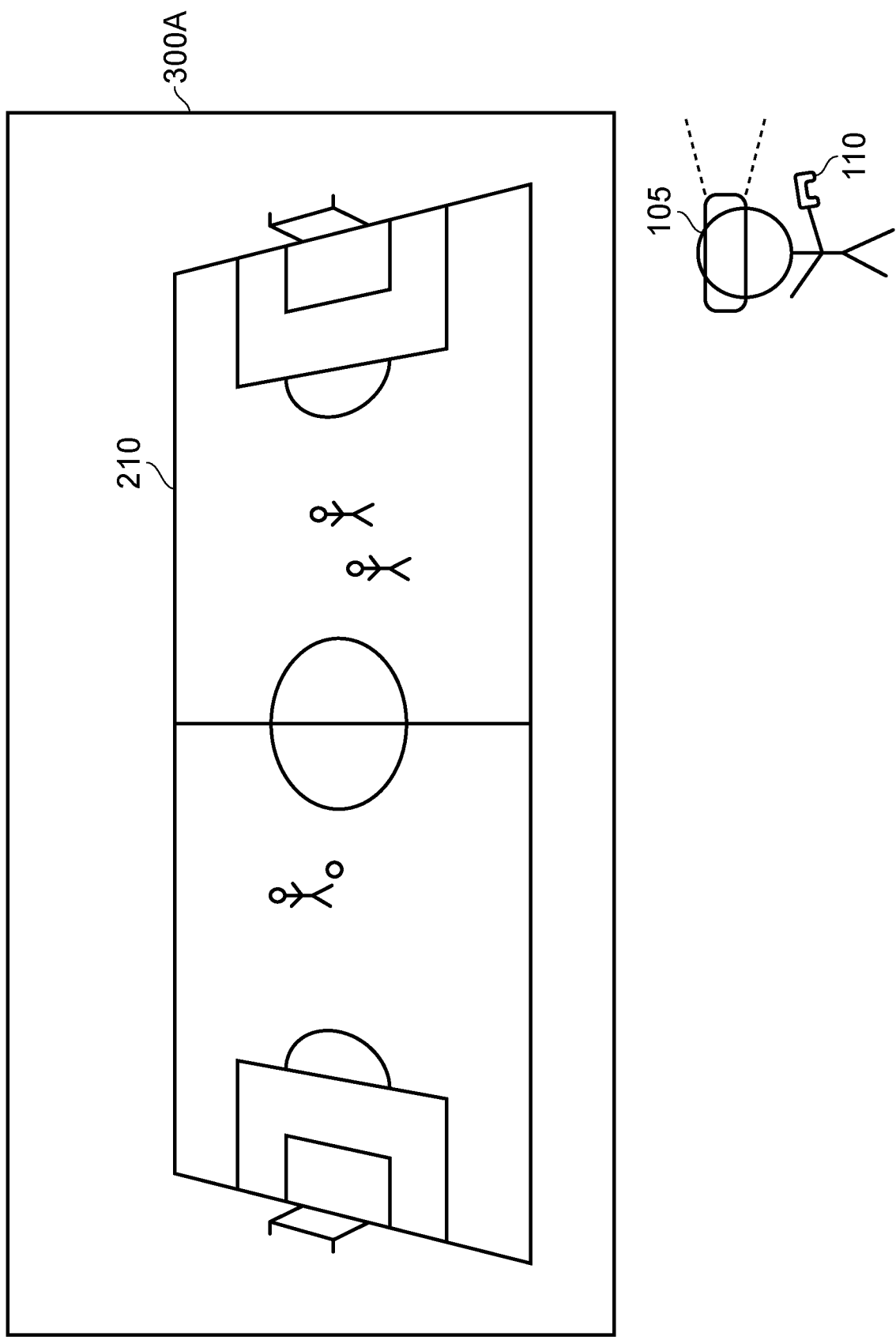
FIGS. 3A to 3C show a virtual reality environment according to embodiments.
Figure 3B:
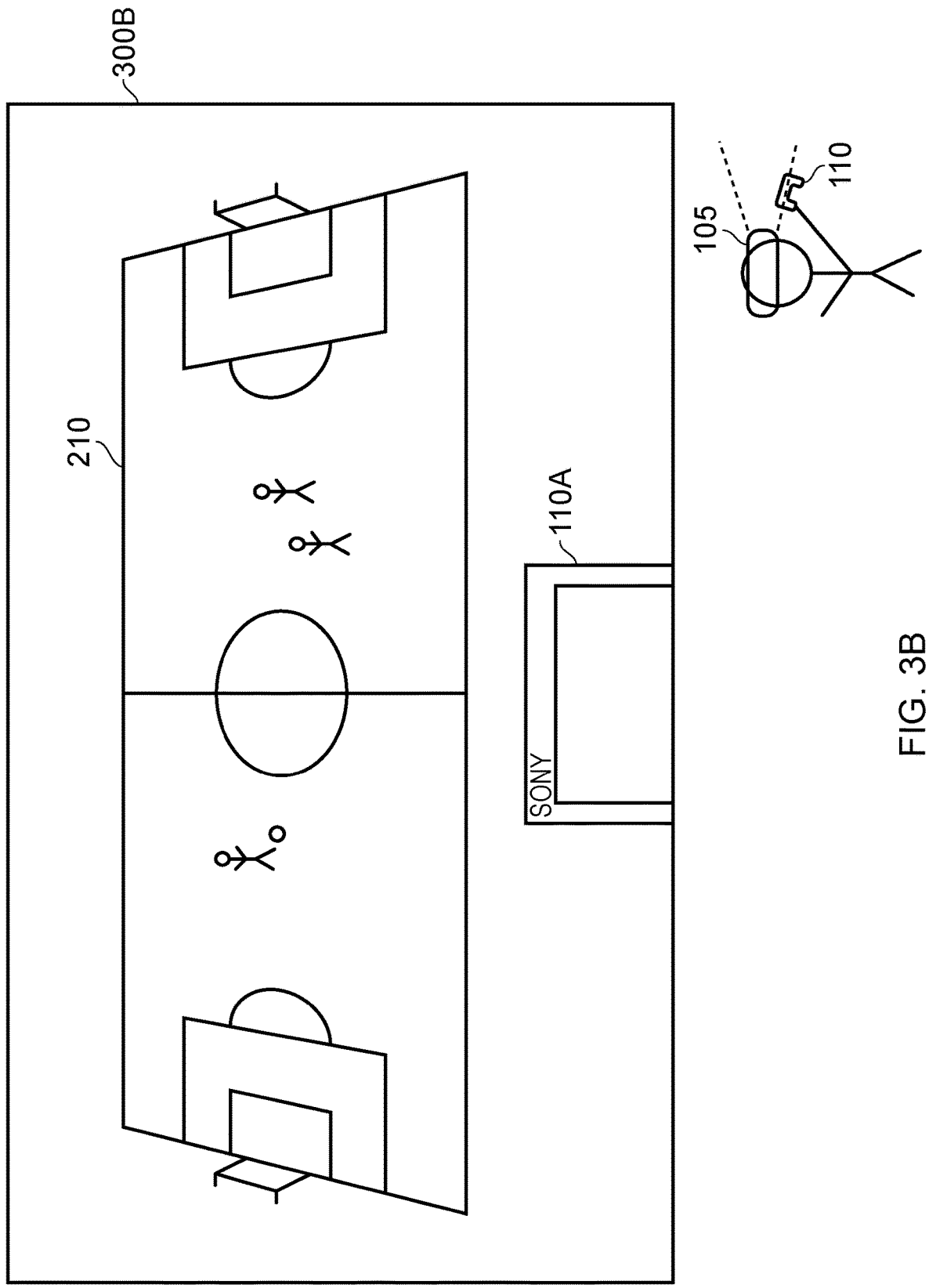
Figure 3C:
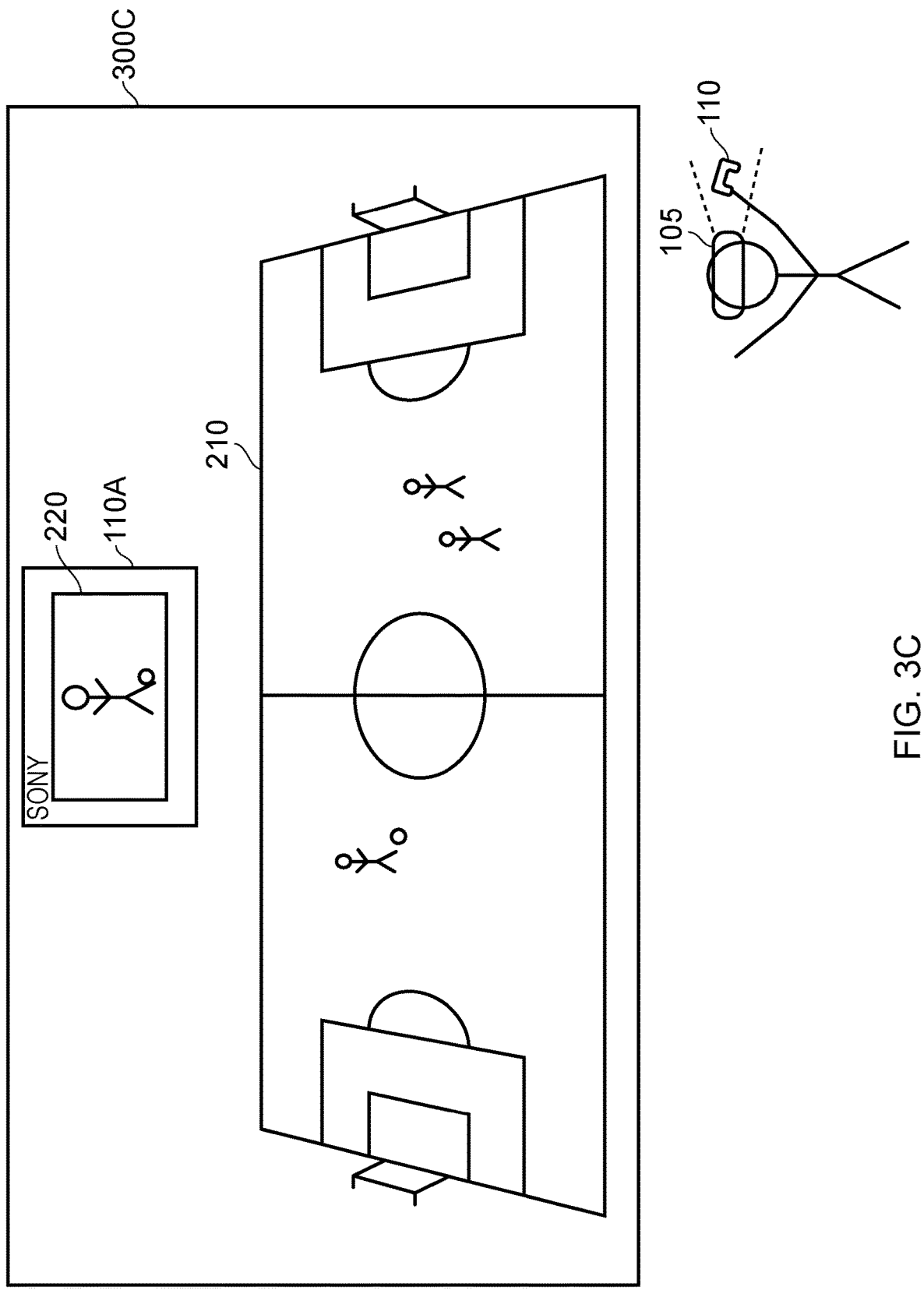

FIG. 3A-3C shows the mechanism using which the user's view 200 of FIG. 2 is constructed. This forms an embodiment of the disclosure. This mechanism may be performed during a setup process or may be changed during the user viewing the event.

In FIG. 3A, the wide angle view of the soccer pitch 210 is displayed to the user in the first setup screen 300A. As can be seen by the position of the control unit 110 relative to the headset 105, the control unit 110 is located outside of the field of view of the user wearing the headset 105. The position of the control unit 110 relative to the field of view of the user of the headset 105 is determined by the headset detector 120 in a known manner.

In FIG. 3B, a second setup screen 300B is shown. In this screen, the soccer pitch 210 is still displayed to the user. However, now a representation of a tablet computer 110A is shown emerging from the bottom of the screen. In other words, the user now sees both the soccer pitch 210 and the top of a representation of a tablet computer 110A.

As can be seen from the graphic in the bottom right of FIG. 3B, the control unit 110 is moved by the user into the field of view of the user of the headset 105. The field of view of the user of the headset 105 is shown by dotted lines in FIG. 3B.

In order to determine that the representation of the tablet computer 110A should be displayed to the user, the headset detector 120 determines the real-world position and orientation of the headset 105 and the real-world position and orientation of the control unit 110 using known techniques. In the instance that the control unit 110 moves into the field of view of the headset 105, a representation of a tablet computer 110A is displayed to the user. In other words, as the controller is moved into the field of view of the user of the headset 105 the position of the control unit 110 within the field of view of the headset 105 in the real-world is transformed into a representation of a tablet 110A in the virtual reality world. The mechanism for determining the relative position between the control unit 110 and the headset 105 in the real world and transforming this relative position in the real world to a position in the virtual reality world is known to the person skilled in the art.

A third setup screen 300C is shown in FIG. 3C. In the third setup screen 300C, the representation of the tablet 110A is positioned above the soccer pitch 210 in the virtual world. The real-world position of the control unit 110 relative to the headset 105 determines where in the virtual world the representation of the tablet 110A is located. In other words, if the user moves the physical position of the control unit 110 in the real world to be within the field of view of the headset 105, the displayed representation of the tablet computer 110A will vary accordingly within the virtual world. This means that the user can position the representation of the tablet 110A anywhere within their field of view within the virtual reality world.

In embodiments of the disclosure, once the user has positioned the representation of the tablet 110A in a location that is desired within the virtual reality view, the user performs a user input to lock the position of the representation of the tablet 110A in the virtual world. The user input may be a particular gesture, such as rotating the control unit 110 in a particular manner; the rotation being detected by the headset controller 120 or being provided by sensors, such as accelerometers located within the control unit 110. Alternatively, or additionally, the user input may be the user pressing a button on the control unit 110. Indeed, other types of user input are envisaged. For example, the user input may be a user blowing when they wish to lock the position of the representation of the tablet 110A. This blowing action will be detected by the microphone positioned in the headset 105 and will give the user the impression of blowing the representation of the tablet 110A into its position.

It is envisaged that the position of the representation of the tablet 110A is locked at a position within the virtual world. In other words, once the representation of the tablet 110A is locked, the user may move their headset 105 and the representation of the tablet 110A will stay stationary relative to the virtual environment. In other words, the 3D position of the representation of the tablet 110A is fixed. This reduces the likelihood the representation of the tablet 110A from interfering with the image of the soccer pitch 210. Additionally, the user will know where they must look in the virtual world in order to view the representation of the tablet 110A. Further, the user may look around the representation of the tablet 110A if necessary.

Of course, the disclosure is not limited to this and, instead, the user may lock the representation of the tablet 110A in the virtual world relative to the field of view of the headset 105. In other words, once locked, the representation of the tablet 110A will move as the user's head moves so that the representation of the tablet 110A is always located at the same position within the user's field of view irrespective of where the user is looking to give a Heads-Up Display experience.

Although the above shows the user having a free choice of location of the representation of the tablet 110A within the virtual world, the disclosure is not so limited. For example, the graphical representation of the tablet 110A may be located in only specific locations within the virtual world. In this instance, the user can move the control unit 110 into the field of view of the headset 105 and may then move the control unit 110 in a specific direction to snap the graphical representation of the tablet 110A to the appropriate default position. For instance, if the graphical representation of the tablet 110A can be locked into a position at the top-left, top-centre and top-right position in the virtual world, once the control unit 110 is in the field of view, the user can move the control unit 110 in the left direction to lock the representation 110A in the top-left position, in the upwards direction to lock the representation of the tablet 110A in the top-centre position and in the right direction to lock the representation of the tablet 110A in the top-right position.

Moreover, although the above describes the representation of the tablet 110A being a single sized tablet being located at different positions in the virtual world, the disclosure is not so limited. For example, the size of the representation of the tablet 110A may be varied. For example, if the user wishes for a larger representation of the tablet 110A to be placed in the virtual world, the user may bring the control unit 110 closer to the headset 105 in the real world. Conversely, if the user wishes for a smaller representation of the tablet 110A to be placed in the virtual world, the user may position the control unit 110 further away from the headset 105 in the real world. As will become apparent later, this may be advantageous because representations of the tablet 110A which display content of particular relevance to the user may be made larger compared to representations of the tablet 110A which display content of less relevance to the user. The size of the representation of the tablet 110A may be changed easily using this technique.

Figure 4:
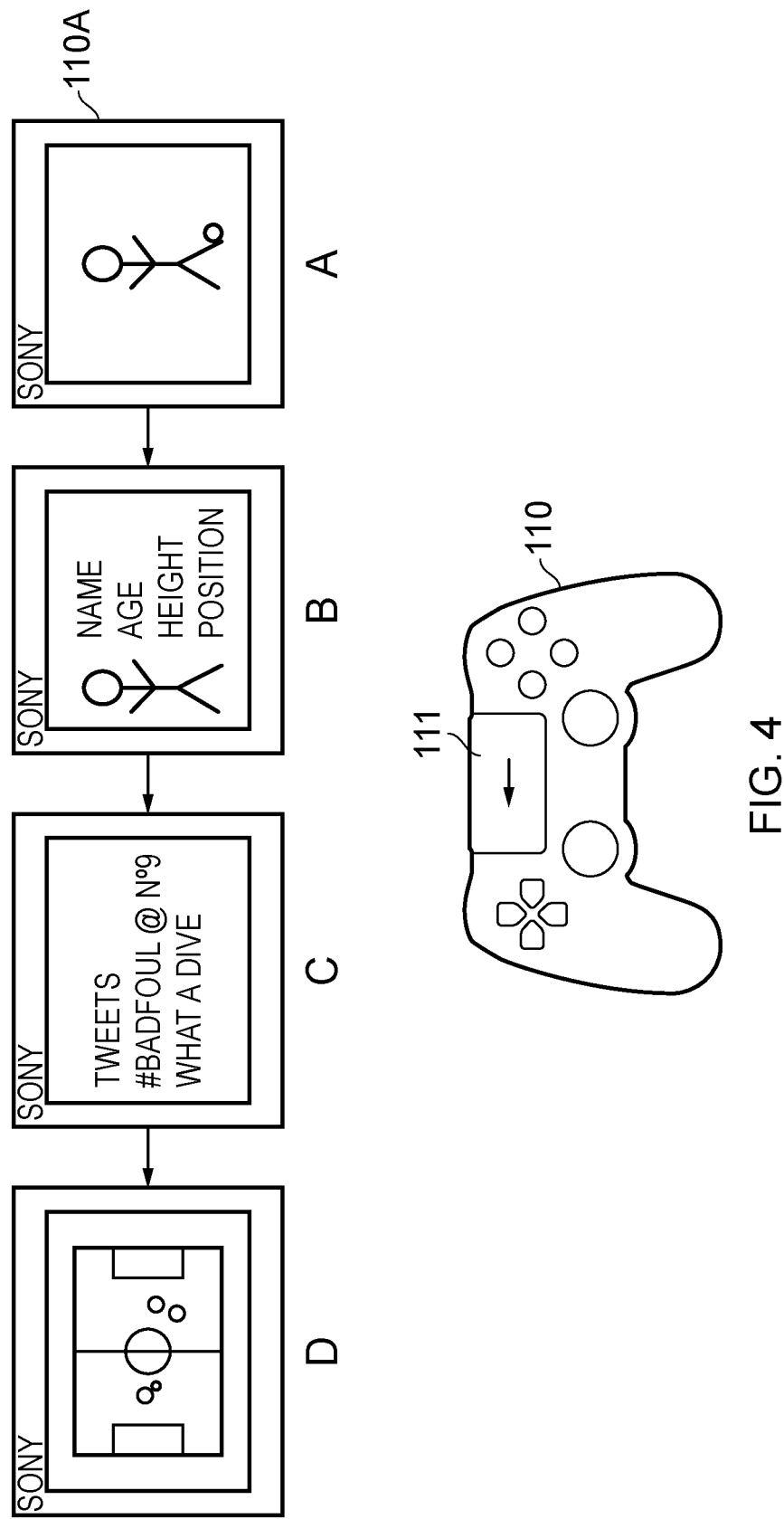
FIG. 4 shows a process explaining the change between various content in the virtual reality environment of FIGS. 3A to 3C.

As noted in FIG. 3A-3C, the representation of the tablet 110A can be of various sizes and/or located at various positions in the virtual world. The representations of the tablet 110A may be used to display the various first, second and third screens explained with reference to FIG. 2. It is possible for the user to place these screens wherever they wish in the virtual world and make them of whatever size they desire, but it is also possible for the user to customise the content displayed on the virtual representation of the tablet 110A. This is shown in FIG. 4 where the transition between the content shown on the representation of the tablet 110A. Of course, the disclosure is not limited to this. For example, although the virtual representation of the tablet 110A can be locked in the 3D virtual environment, it is possible that the virtual representation of the tablet 110A is not locked and so will move depending on where the user is looking. Also, the virtual representation of the tablet 110A may be unlocked from one particular position and moved to a different position where it can then be locked.

Indeed, as an additional or alternative technique, the position of the virtual representation of the tablet 110A may change depending on other criteria. For example, the dwell time of the user's gaze within the virtual environment may be measured using known techniques. The virtual representation of the tablet 110A may then be placed at the position in the virtual representation of the tablet 110A at which the user is gazing if the dwell time is at or above a threshold period. For example, if the user stares at a particular part of the stadium for a period of time at or greater than a threshold time, the virtual representation of the tablet 110A will be located at that part of the stadium. This allows the position of the virtual representation of the tablet 110A to be moved to a position which is best for the user without the user having to specifically interact with the system. In the alternative case, the user may simply provide a user input, such as a voice command or select a menu item, to generate the virtual representation of the tablet 110A and the position of the virtual representation of the tablet 110A in the virtual environment is determined by the gaze of at least one or both of the user's eyes. The dwell time of the user's gaze may then automatically move the position of the virtual representation of the tablet 110A. That is, when the dwell time of the user's gaze is above a threshold, the virtual representation of the tablet 110A will move.

In embodiments of the disclosure, the broadcast screen 220 may be the first default screen shown on the representation of the tablet 110A. This is shown in image A. The user may then transition to the content shown in image B of FIG. 4. This transition may be effected by swiping on a touch pad 111 provided on the control unit 110. In other words, the user can perform a virtual swipe on the tablet representation 110A by performing a real world physical swipe on control unit 110 using touch pad 111.

In the example of FIG. 4, the broadcast screen 220 transitions to the information screen 230. The user can then position the information screen if they so desire in the field of view in the virtual world using the technique explained with reference to FIGS. 3A-3C.

Alternatively, if the user does not want to place the information screen 230 on the field of view, they can perform a second swipe on the control unit 110 using touch pad 111 so that the representation of the tablet 110A shows the social media screen 240. This is shown in image C of FIG. 4. Again, the user can then place the social media screen 240 within the field of view of the user and lock this in place using the same techniques as described in FIGS. 3A-3C. Finally, if the user so desires, they can swipe again on the touch pad 111 of control unit 110 and display an overhead representation of the players and the ball on the soccer pitch or field. This is shown in image D.

The overhead representation of the soccer pitch, may be derived from position information of the players and the ball on the captured image of the soccer pitch. The mechanism for deriving the position information of the players and the ball from an image is a known technique. Alternatively, the position information may be derived using information derived using a separate technique. For example, the position information of one or more players and/or ball information may be derived using technology such as the SMART coach developed by Hawkeye Innovations. For example, in the event that the venue is a tennis court, the position information may be position information of the ball when it strikes the tennis court and/or the position of the players. This technology is known and has been developed by Hawkeye Innovations Limited.

Although four different screens are shown, the disclosure is no way limited to this. The number of screens through which the user may transition may be greater or less than this number. The number of screens may be increased or decreased by the operator of apparatus 200 and this may be determined based on a subscription paid by the user. Alternatively or additionally, the number of screens may be determined by the user. For example, the user may wish to only be provided with a subset of the available screens depending upon the user's choice. This would allow the user to only be provided with screens of interest and thus make selection of the screen(s) of choice easier.

Additionally, once the user has reached the end of the available screens (in this case image D), in embodiments of the disclosure, a further swipe in the direction of the arrow on touchpad 111 would cycle back to screen A. Of course, alternatively, the user may need to swipe in the opposite direction to move back through the screens. In other words, once screen D has been reached, the user may need to swipe to the right to transition to screen C, then screen B and then screen A.

Although the above describes a left (or right) swipe, it is envisaged that the user may swipe in an up or down manner to cycle through the various screens.

The user may select a screen of interest using a button on the control unit 110 or by moving the control unit 110 in a specific direction. After selection of a screen, and upon placement of the screen in the virtual world, the screen may be removed from the list of screens shown in FIG. 4. This means that selection of new screens for display is easier as it is unlikely a user will desire two screens showing the same content in the virtual world.

Although the above describes the positioning of a representation of a tablet computer 110A, the disclosure is not so limited. For example, the graphical representation may be of a book, or a television screen.

Additionally, the user may select different graphical representations which may be applied to all or some of the screens for insertion into the field of view. For example, the user may wish to select a representation of a vintage style television, or mobile telephone instead of a tablet computer. This allows the user to better customise the experience.

Indeed, the graphical representation may not even be of a device with a screen. For example, the graphical representation may be of a book or magazine. The user will perform a swipe using the control unit 110 and a page in the book or magazine will be turned. The content for display may be in the plane of the page or, in embodiments, may be a "pop-up" style book, where the content will come out of the plane of the book.

Moreover, although the above describes displaying a graphical representation of a tablet to view content, the disclosure is not so limited. For example, the tablet computer in the virtual world may include a keyboard and a web browser. In this example, the web browser displays on the virtual tablet a live connection to the Internet. The user can therefore use the virtual representation of the tablet computer to access the real world version of the internet. This allows the user to access real web content whilst being immersed in the virtual world.

Figure 5:
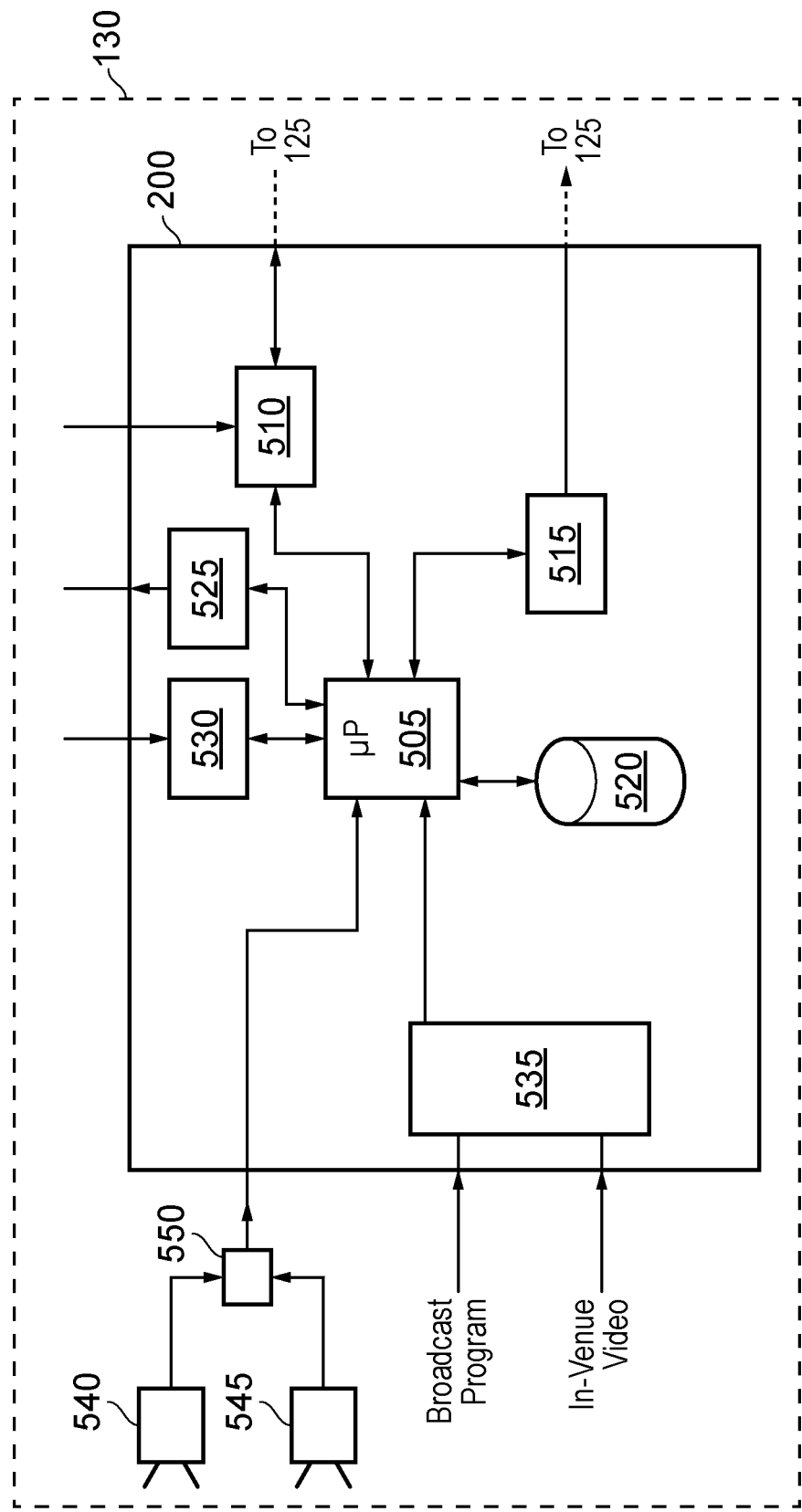
FIG. 5 shows a device 130 according to embodiments of the disclosure.

Referring to FIG. 5, the venue 130 includes an apparatus 200 according to embodiments of the disclosure. A wide angle camera 540 is connected to the apparatus 200. As noted above, the wide angle camera 540 captures the wide angle view of the soccer pitch 210. As already noted, of course, the wide angle camera 540 may be a plurality of cameras having an overlapping field of view and which collectively produce a stitched image.

Additionally connected to the apparatus 200 is a dressing room camera 545 which is located in one of the dressing rooms to capture content of the players prior to the running onto the pitch, at half time during a team talk and after the match.

Of course, other cameras may be provided which replace or are in addition to those explained above. For example, the dressing room camera 545 may be replaced with a commentary booth camera. Of course, the disclosure is not limited to this and the camera may be located anywhere where spectators are not normally allowed. This camera will capture content of so called "television pundits" either during the match or during half-time and full time.

Both the wide angle camera 540 and the dressing room camera 545 are connected to switch circuitry 550. The switch circuitry 550 is configured to switch between the wide angle camera 540 and the dressing room camera 545. The output of the switch circuitry 550 is displayed to the user as a main backdrop. So, in the example of FIG. 2, the main backdrop was the soccer pitch which was provided by the wide angle camera 540. However, this backdrop can be changed using the switch circuitry 550 so that the user's backdrop view is varied during different periods of the match.

For example, prior to the start of the soccer match, the user may view the dressing room camera 545 as this is more interesting to the viewer than a view of an empty soccer pitch. However, once the match commences the output of the switch circuitry 550 will be the image captured by the wide angle camera 540.

As this content will provide the backdrop of the user's field of view, the switch circuitry 550 is configured to transition between the dressing room camera 545 and the wide angle camera 540 slowly.

For example, the switch circuitry 550 may be configured to produce a black screen for 5 seconds during the transition from the dressing room camera 545 to the wide angle camera 540 for viewer comfort.

Apparatus 200 also receives a broadcast program feed and an in-venue video feed.

The broadcast program feed is the video feed that is broadcast to viewers watching at home. The broadcast program feed provides the content that is displayed on the broadcast screen 220. Similarly, many venues have a separate video feed which shows entertainment for the spectators at the event. For example, the venue may provide a so called "kiss-cam" where spectators are selected at random and their image is displayed within the stadium. They are then encouraged to kiss one another to entertain the crowd.

Other examples of an in-venue video feed include prize draws with the winners being shown in the stadium, highlights of certain events during the match and videos associated with the football club. The broadcast program feed and the in-venue video feed are both fed into buffer circuitry 535 located within apparatus 200.

The buffer circuitry 535 is optional and allows for non-real time processing of the content. The purpose of the buffer circuitry 535 is to temporarily store the broadcast program feed and the in-venue video feed whilst the remaining circuitry within the apparatus 200 processes other data. Of course, the buffer circuitry 535 may not be provided in the event that the apparatus 200 can operate in real time.

The output from the buffer circuitry 535 is fed into a controller 505. The controller 505 may be embodied as controller circuitry which may be solid state circuitry configured to operate under the control of a computer program.

Additionally connected the controller circuitry 505 is storage 520. The storage 520 may include a computer program which controls the operation of the control circuitry 505. The storage 520 may be a solid state storage device or may be a magnetic readable storage device or an optically readable storage device. Other content such as player representations or so called "avatars" of the players in the match may also be stored in the storage 520. Other information such as advertising information and user profile information may also be stored within the storage 520. This will be explained later.

Additionally connected to the controller circuitry 505 is user input circuitry 530. The user input circuitry 530 is connected to a user input device (not shown) which may be a mouse or keyboard or the like that allows a user to control the apparatus 200. Any kind of mechanism such as gesture recognition is also envisaged for the user to control the apparatus 200. In addition, user output circuitry 525 is provided.

Examples of the user output circuitry 525 include a display driver circuitry, a user interface to be displayed to the user of the apparatus 200, or any kind of output which may be provided to the user. The user output circuitry 525 and the user input circuitry 530 operate under the control of the controller circuitry 505.

Additionally connected to the control circuitry 505 is encoder circuitry 510. The encoder circuitry 510 is also connected to the internet 125. The encoder circuitry 510 provides content to the PS4® 115 via the internet 125 for display on the headset 105. The content may be encapsulated as IP packets to be sent over the internet 125. Of course, other formats of content are envisaged such as Dynamic Adaptive Streaming over HTTP (DASH) is envisaged. The encoder circuitry 510 is configured to operate under the control of the controller circuitry 505. The operation of the encoder circuitry 510 will be explained with reference to FIG. 6.

Additionally connected to controller circuitry 505 is a web server 515. The web server is also connected to the internet 125 and sends content to the PS4 115 via the internet 125.

It is important to note that the content provided by the web server 515 may include the positional information generated from the image or generated by a third party such as Hawkeye Innovations as explained above. This positional information identifies the position of players and a ball on a pitch, for example.

Additionally, other content such as the information provided in the information screen 230 will be provided by the web server 515. This information may be stored on the web server 515 or may be stored elsewhere (either within the storage 520 of the apparatus 200 or at a third party site) and provided over the internet 125 by the web server 515.

The difference between the content provided by the web server 515 and the encoder circuitry 510 is that the content provided by the web server 515 is asynchronous. In other words, the content provided by the web server 515 may be provided at any time to the user and thus synchronization of the content for display to the user from the web server 515 is not important.

Figure 6:
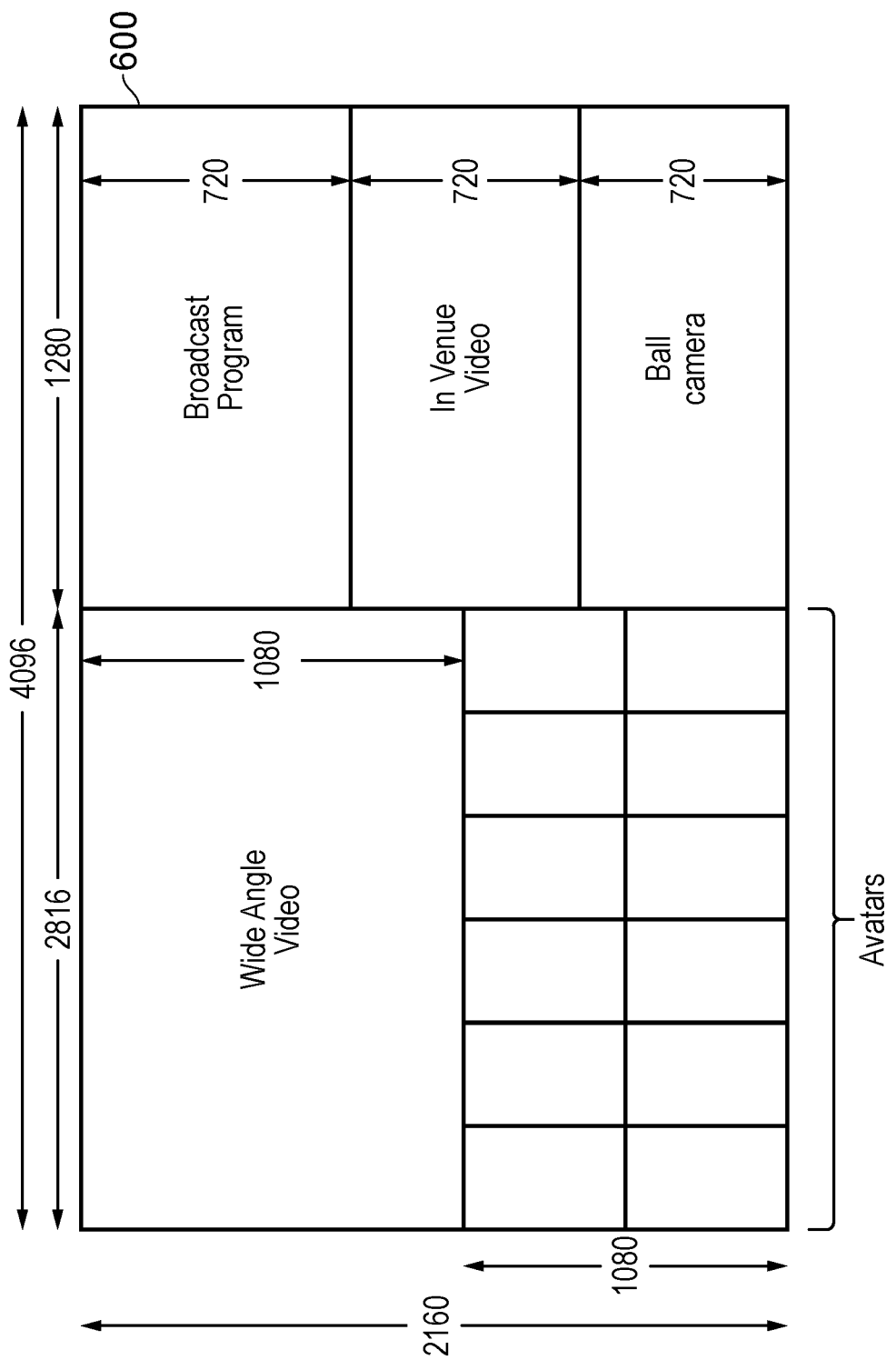
FIG. 6 shows an encoding technique according to embodiments of the disclosure.

However, all data provided by the encoder circuitry 510 is synchronous data. This means that the content that is sent using the encoder circuitry and using the method explained with reference to FIG. 6 is synchronised data. In other words, the content provided by the encoder circuitry 510 must arrive at the PS4® at the same time (or at least with a defined temporal difference) to mitigate the risk of the content being incorrectly displayed to the user.

Referring to FIG. 6, the output of the encoder circuitry 510 according to embodiments of the disclosure is shown. Specifically, encoded video 600 is output from the encoder circuitry 510.

The encoded video 600 is, in embodiments, a 4K image. In other words, the encoded video 600 has a resolution of 4096×2160 pixels. Of course, the disclosure is not so limited and any resolution is envisaged.

Rather than transmitting a single 4K image, however, in embodiments of the disclosure all synchronised data is encoded to be transmitted in the encoded video 600. Specifically, the output of the switch circuitry 550 is encoded as an image having a resolution of 2186×1080 pixels. In other words, depending on the output of the switch circuitry 550, either the wide angle video feed from the venue captured by the wide angle camera 540 or the dressing room camera 545 is encoded as a wide angle video having a resolution greater than 1080p.

As the output from the switch circuitry 550 is of the same event as the broadcast program, it is important to ensure that the wide angle video of the soccer pitch is synchronized with the broadcast program which is shown on the broadcast screen 220. This is because the broadcast program is of the same event as the wide angle video and any delay between the two feeds will result in inconvenience for the user.

The output of the switch circuitry 550 (which is termed the broadcast program feed) is encoded as an image having a resolution of 1280×720 pixels. This is sometimes referred to as a 720p image.

Similarly, the in-venue video feed is also encoded within the encoded video 600. This is transmitted as a 720p signal having a resolution of 1280 by 720 pixels.

Additionally, the data that identifies the exact position of the ball and the players at a specific time must be synchronised with the broadcast program and the wide angle video. Therefore, this data is also transmitted in the encoded video 600. This is identified as the "ball camera" in FIG. 6 and is transmitted with a resolution of 1280 by 720 pixels.

Additionally, video of the individual players on the pitch may also be transmitted within the encoded video 600. These are noted as the Avatars in FIG. 6 and have a vertical resolution of 1080p. In other words, the encoding circuitry 510 may extract a cut out of the players from the captured wide angle video and transmit these as the avatars. Alternatively, a specific player cam may also be provided whereby the individual players are captured by separate cameras as they play in the soccer match. As the movement of the player at any one time has to be synchronized with the overall wide angle picture, these Avatars will be encoded within the encoded video 600 and transmitted by the encoding circuitry 510 to the PS4 @ 115 via the internet.

In order to ensure the content is synchronised, in embodiments of the disclosure, the content from each of the different sources is optionally provided with a timestamp included with the content. The timestamp indicates the time at which the content is produced or captured. It is envisaged that the timestamp is applied when the content is generated. For example, the wide angle camera 540 or the dressing room camera 545 may insert the timestamp. Alternatively, of course, the switch circuitry 550 may insert the timestamp. Further, the broadcast program content, the in-venue video feed, the ball camera content and the avatar content will also include a timestamp indicating the time at which that content is created.

The provision of the timestamp acts as a double-check to ensure that the encoding circuitry 510 encodes content that is produced simultaneously at each of the different sources. Of course, this is optional. It is further optional for the apparatus 200, and specifically, the controller 505 to issue a synchronisation signal to each of the devices producing synchronised content. This may be sent prior to the operation of the apparatus 200 or during operation of the apparatus 200. This synchronisation signal resets the timestamps within each of the devices so that any drift in the timestamps over time is mitigated.

An advantage with providing all concurrent video in synchronicity means that all image data that must be synchronized arrives at the same time at the PS4® 115 and so can be displayed to the user without any delay between the various different video sources. In other words, by encoding the video sources which must be synchronized into an encoded video 600, the display of the video to the user will be synchronized and will allow the user to view several sources at the same time within the immersive virtual reality without any temporal discrepancy between the various sources of video.

Similarly, it is noted that although the above discusses sending video in a synchronised manner, it is envisaged that audio which must be synchronised may be additionally or alternatively transmitted by the encoding circuitry. More generally, therefore, the synchronised content (which may be image or audio data) is provided by a plurality of different sources.

Also, although the above mentions certain resolutions, the disclosure is no way limited to this. For example, larger or smaller images may be transmitted by the encoding circuitry.

Figure 7A:
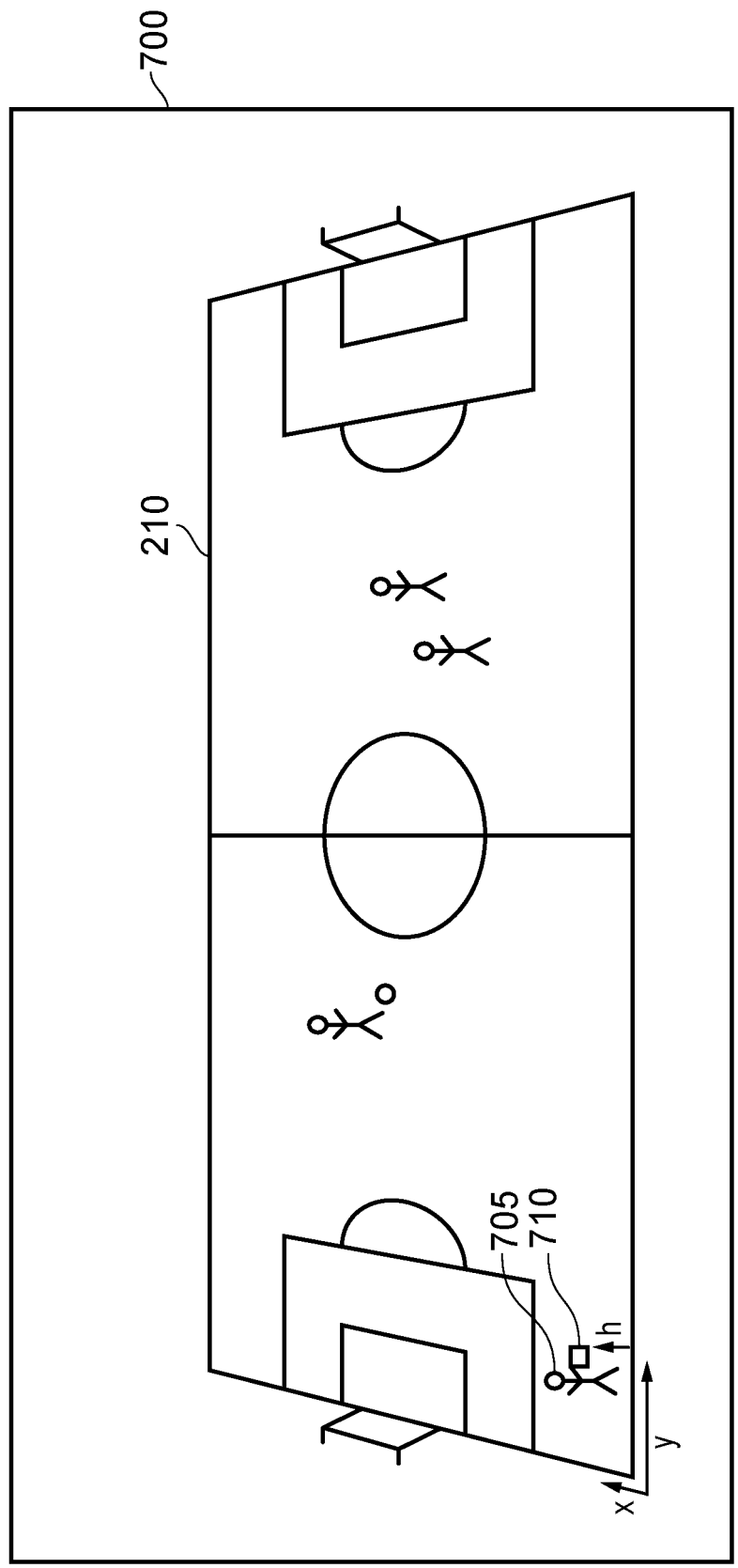

Referring to FIG. 7A, an object throwing embodiment is described. This is explained with reference to a user view 700. In FIG. 7A, the soccer pitch 210 is shown. In addition to the soccer players, a further person 705 is presented on the pitch. This person is, in embodiments, a television or radio celebrity such as Rick Astley or a sports star such as Andy Murray. It is envisaged that the person will appear in the user's view during intervals, commercial breaks or when there is little movement on the pitch.

Figure 7B:
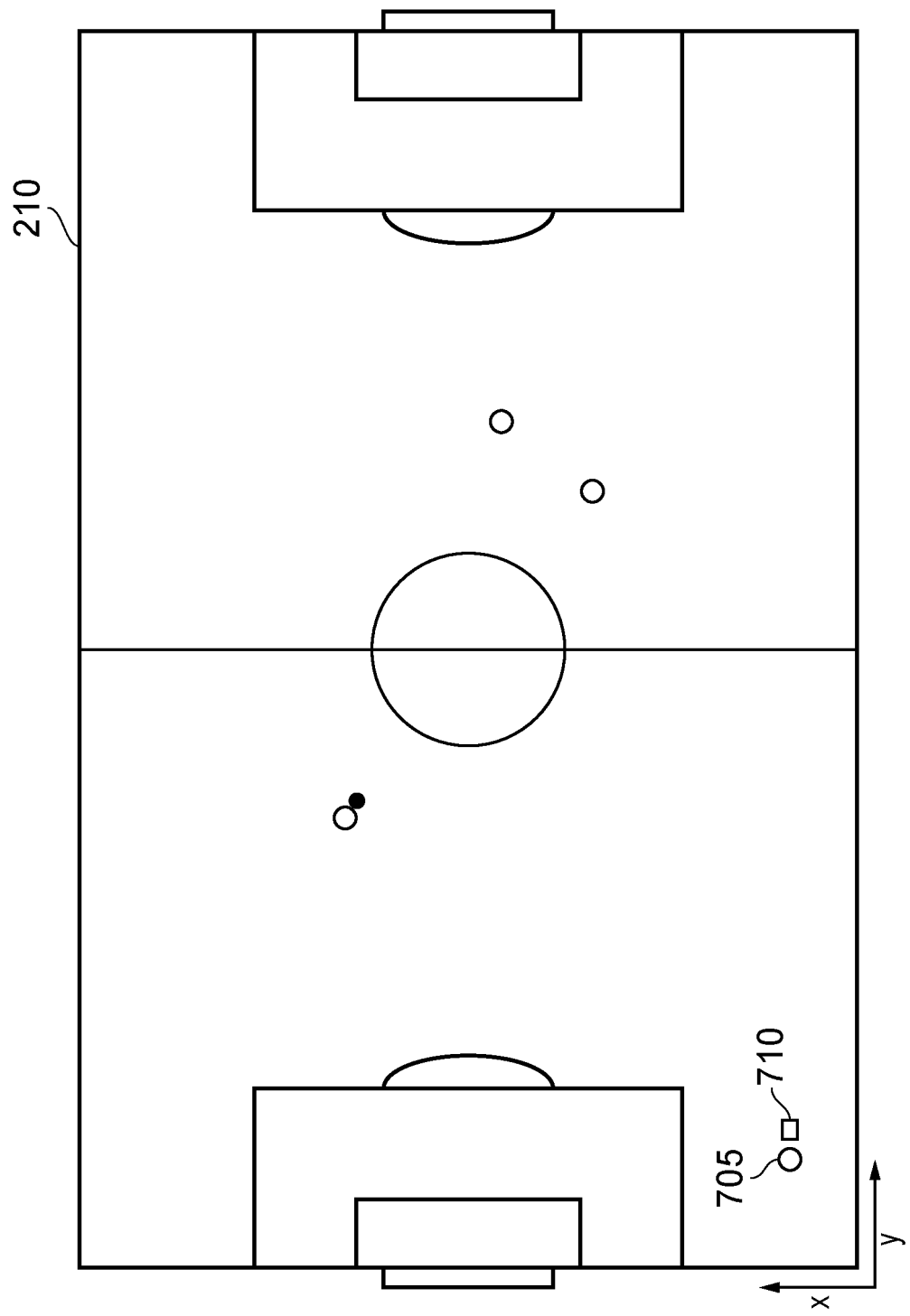

In embodiments, the person is a captured image or sequence of images of the celebrity. These may be captured in front of a blue or green screen and chroma keyed so that the person can be seamlessly inserted onto the image of the pitch 210. Therefore, the captured image is a two-dimensional image of the person. This is seen in FIG. 7B where an aerial view of FIG. 7A is shown.

The person 705 is seen carrying an object 710. This object is carried by the person 705 in the captured image. In other words, the person 705 carries the object 710 when the image or sequence of images of the person 705 is captured. The object is located at a position (x,y) on the soccer pitch 210 (see FIG. 7B) relative to the bottom left hand corner of the pitch 210. The position of the object is determined when the image is captured in that the height at which the object is carried is known. Therefore, the object is positioned at a height h above the plane of the pitch 210 in view 700.

Figure 7C:
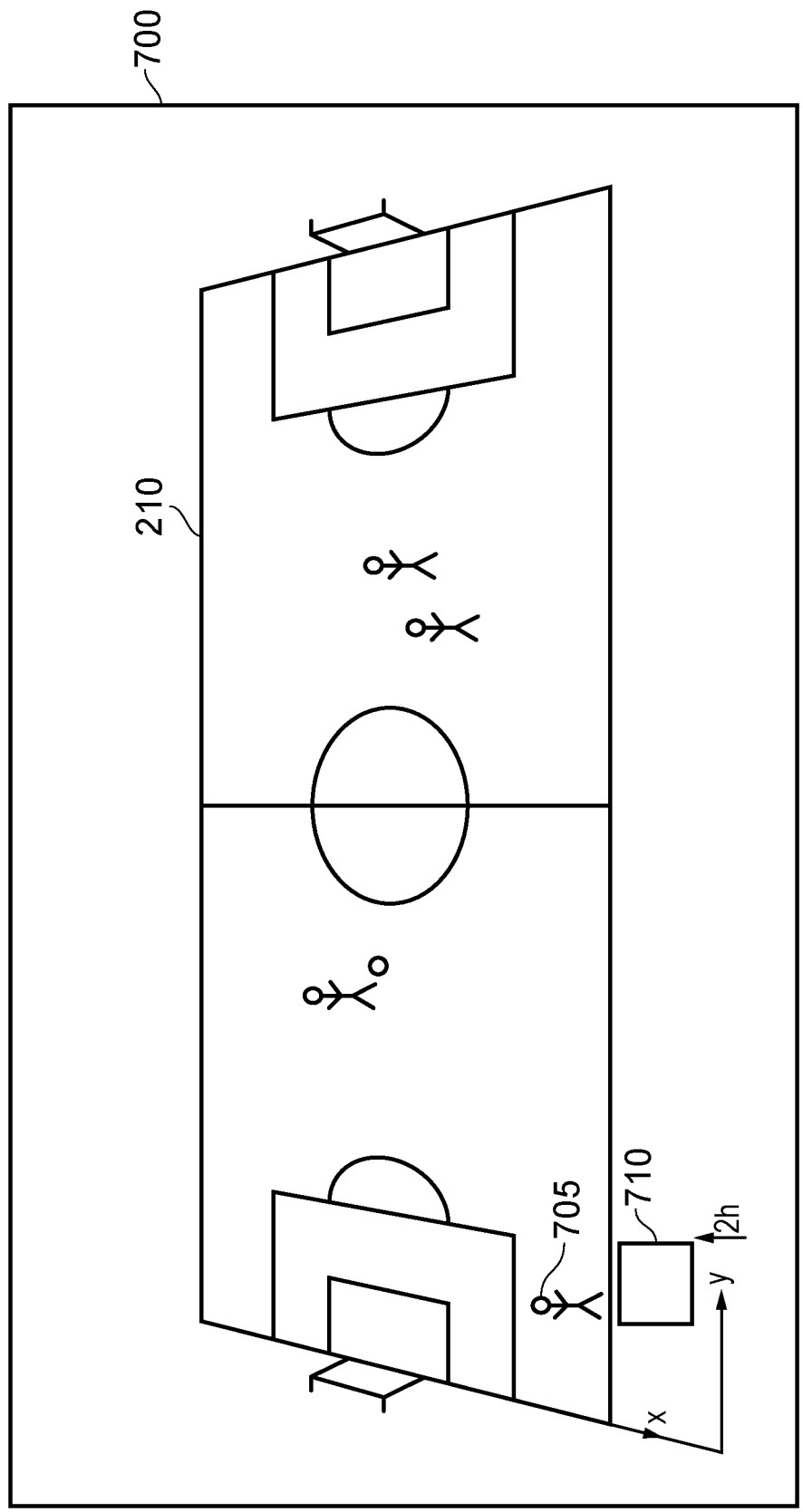
Figure 7D:
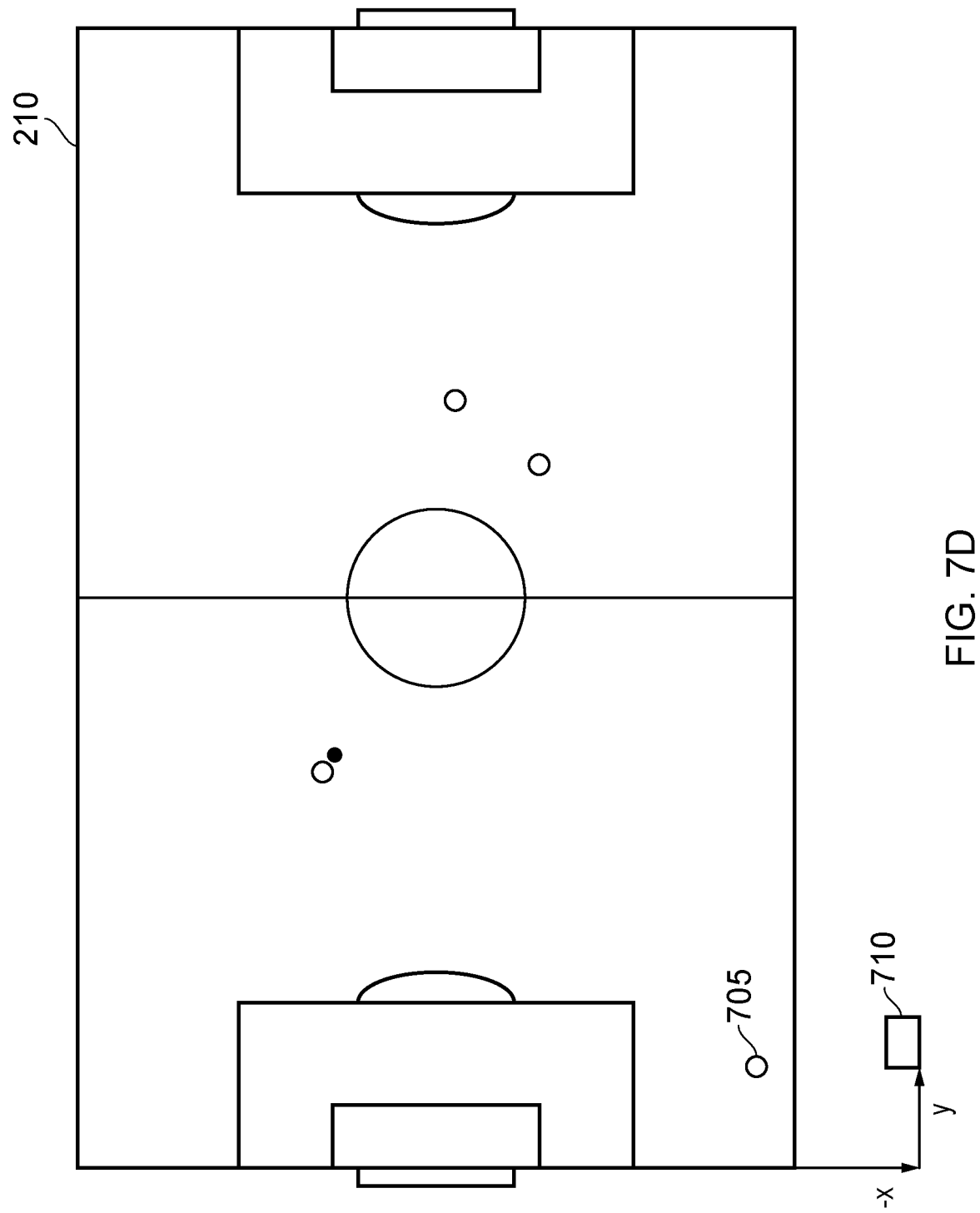

The person 705 then throws the object 710 towards the viewer. This is shown in FIGS. 7C and 7D.

It is important to note here that the object 710 just before it is thrown to the viewer is replaced with a graphical representation of the object 710. In other words, before the object is thrown, the object is carried by the person in the captured image and so is part of the captured image of the person 705. However, the movement of the captured image of the person carrying the object is paused and when the image is stationary and just as the object is thrown, the image is replaced with an image of the person 705 carrying no object and a graphical representation of the object is inserted at position (x,y) and at a height h in the view 700.

This is useful because moving the captured image of the person 705 across the pitch 210 is computationally inexpensive compared with moving a graphical representation of the object with the captured image of the person 705 in a natural manner. In other words, the advantage with inserting a captured image of an person carrying an object in the virtual reality environment and moving the captured image (having a person carrying an object) within the virtual reality environment is that moving the captured image in the virtual reality environment is easier for the processing circuitry to compute than moving a graphical representation of the object with an image of the person. Then to have the effect of the person throwing the carried object, by pausing the movement of the captured image in the virtual reality environment, generating a rendered representation of the carried object; overlaying the rendered representation on the captured image; and moving the rendered representation within the virtual reality environment provides the effect of moving the representation of the carried object. However, as this is moved from a stationary image, the computational expense is reduced.

When the captured image of the person is stationary however, it is computationally inexpensive to insert a graphical representation of the object at the stationary position (x,y) and at a height h. In order to avoid a clash of images, however, the graphical representation is either overlaid on the captured image of the person or the captured image of the person may be replaced with an image of the person not carrying an object and the graphical representation placed where the object was located in the captured image.

Referring to FIGS. 7C and 7D, the object 710 is at a position (-x,y) relative to the bottom left hand corner of the pitch 210 and at a height $2h$ above the plane of the pitch 210. As the movement of the object from the position (x,y) and at a height h to the position (-x, y) and at a height $2h$ is linear, the size of the object increases.

Specifically, and as seen in FIG. 7E, the size of the object increases linearly from a pixels high and b pixels wide in FIG. 7A to c pixels high and d pixels wide in FIG. 7C. The technique of scaling the size of an object as it moves towards a user is known in the art. In particular, in embodiments of the disclosure, the original dimensions of the object in FIG. 7A is determined and the dimensions of the object in FIG. 7C are determined. The movement from the resolution in FIG. 7A to the resolution in FIG. 7C is then performed linearly.

The graphical representation of the object 710 is, in embodiments of the disclosure, a product which may be of interest to the user. In particular, the product may be selected by a sponsor of the event, or may be selected based on user preferences or a profile of the user.

Although graphical representation of the object 710 is shown moving towards the user, at an appropriate position in the user's view, the object 710 will stop. This position may be a certain perceived distance from the user or may be when the object appears to rest on the graphical representation of a tablet 110A described above.

The user may interact with the graphical representation of the object 710. In order to interact with the graphical representation of the object 710, the user may use the control unit 110. For example, the user may use the touchpad 111 or directional keys on the control unit 110 to rotate the object. The user may press a button on the control unit 110 in order to find out more information about the object. For example, pressing the "X" button may display the cost of the object, purchase options, retailer information or object specifications. Additionally, if the object is of no interest to the user, the user may perform a swipe on the touchpad 111. This gives the user the impression of throwing the object away.

The graphical representation of the object will then disappear from the user's view. Alternatively, the user may press a different button (for example an "O"). In this case, the object may be purchased.

The analysis of the interaction of the user with the object may be captured and stored. Specifically, the period of time for which the user interacts with the product may be measured. Similarly, the type of interaction the user has with the object may be measured. For example, the views of the product seen by the user and the overall outcome (whether the user purchases the object or not) is measured. This analysis is sent back from the PS4® to the apparatus 200 over the internet 125 to be stored in the storage 530.

Depending on the analysis of the interaction, different objects of interest to the user may be provided to the user. For example, if the user purchases a large number of watches which are thrown to the user by the person 705, then more watches may be selected as the object. This ensures that the user is offered products of interest.

Figure 8:
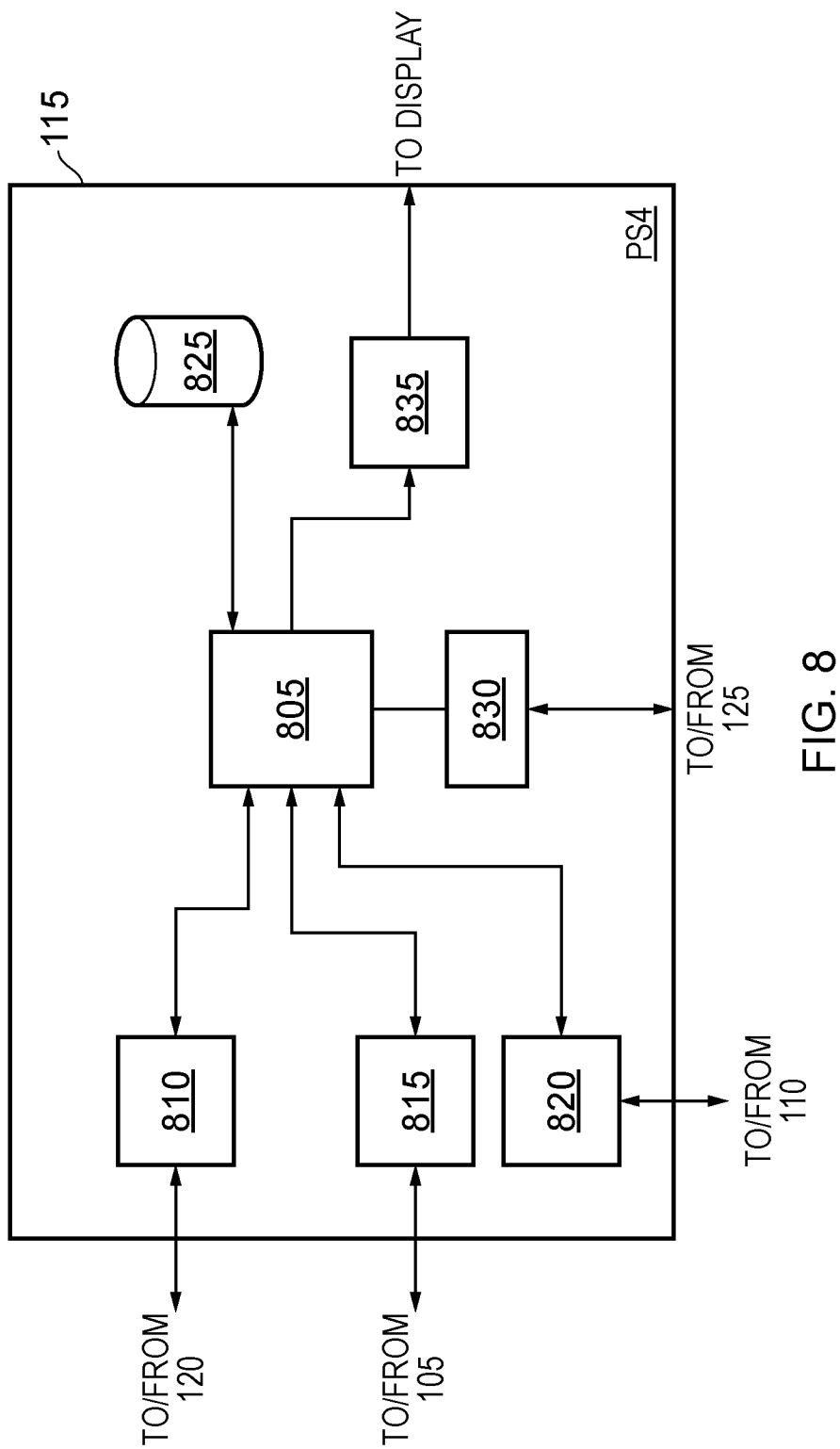
FIG. 8 shows a PS4 ® according to embodiments of the disclosure.

FIG. 8 shows a block diagram of a PS4® according to embodiments of the disclosure. The PS4 ® is controlled by a controller 805. The controller 805 may be embodied as controller circuitry which may be solid state circuitry configured to operate under the control of a computer program.

Additionally connected to the controller circuitry 505 is storage 825. The storage 825 may include a computer program which controls the operation of the control circuitry 805. The storage 825 may be a solid state storage device or may be a magnetic readable storage device or an optically readable storage device.

The controller 805 is also connected to headset detector interface circuitry 810. The headset detector interface circuitry 810 sends data to and receives data from the headset detector 120. The controller 805 is also connected to headset interface circuitry 815. The headset interface circuitry 815 sends data to and receives data from the headset 105.

The controller 805 is also connected to controller interface circuitry 820. The controller interface circuitry 820 sends data to and receives data from the control unit 110. The controller 805 is also connected to network interface circuitry 830. The network interface circuitry 830 sends data to and receives data from the internet 125 or any kind of network.

The controller 805 is also connected to display interface circuitry 835 which sends display data to a display such as a television. This may be done in addition or in replacement of video and/or audio data to be sent to the headset 105.

Figure 9:
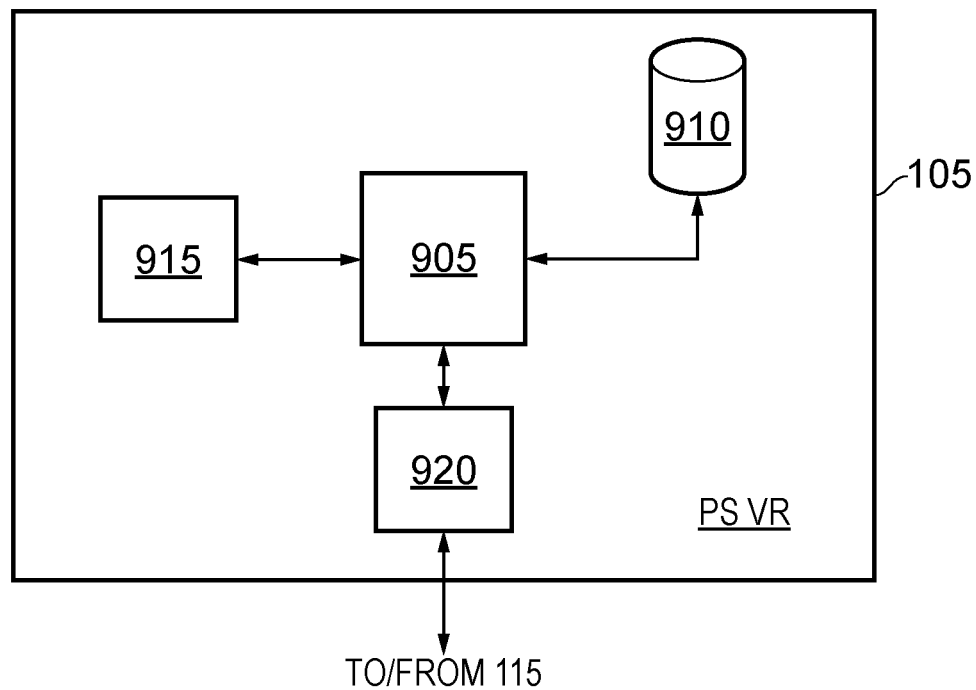
FIG. 9 shows a headset 105 according to embodiments of the disclosure.

FIG. 9 shows a block diagram of a PS VR according to embodiments of the disclosure. The PS VR is controlled by a controller 905. The controller 905 may be embodied as controller circuitry which may be solid state circuitry configured to operate under the control of a computer program.

Additionally connected to the controller circuitry 905 is storage 910. The storage 910 may include a computer program which controls the operation of the control circuitry 905. The storage 910 may be a solid state storage device or may be a magnetic readable storage device or an optically readable storage device.

The controller 905 is also connected to PS4 interface circuitry 920. The PS4 interface circuitry 920 sends data to and receives data from the PS4® 115.

The controller 905 is also connected to a display 915. This displays a virtual reality environment to the user.

Figure 10:
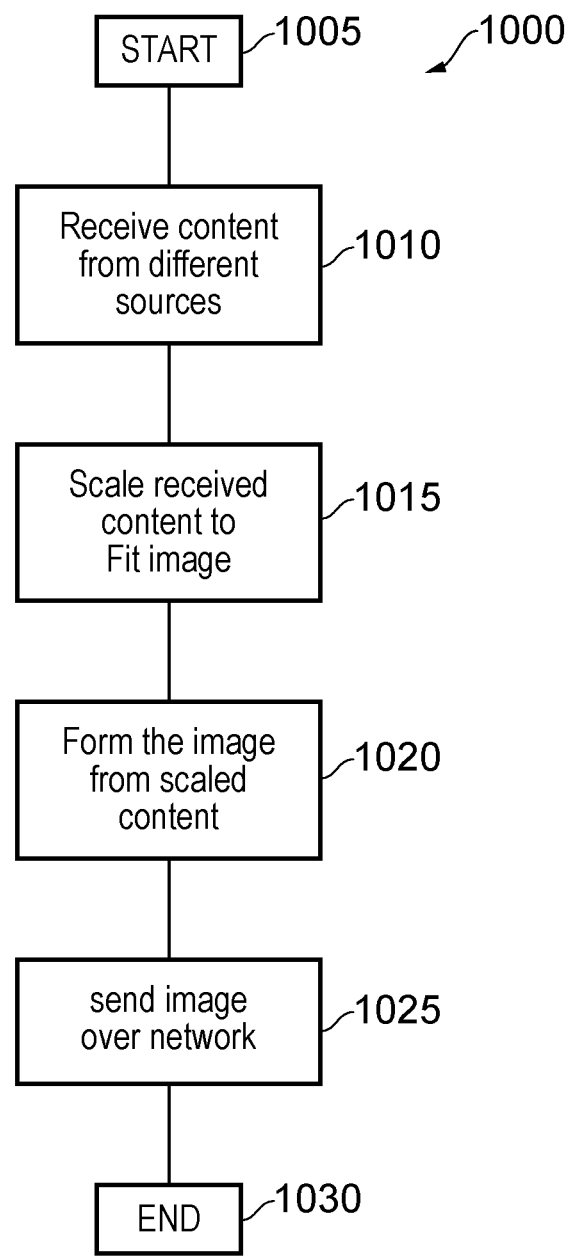
FIG. 10 shows a process 1000 according to embodiments of the disclosure.

FIG. 10 shows a flow chart 1000 explaining the process of FIG. 6. The flow chart 1000 starts at step 1005. The controller 505 receives content from a plurality of different sources in step 1010. The controller 505 then scales the received content to fit into the image as shown in FIG. 6. This is step 1015. The controller 505 then forms the image from the scaled content in step 1020. The controller 505 then sends the image over the internet 125 using the encoder circuitry 510. This is step 1025.

The process ends in step 1030.

Figure 11:
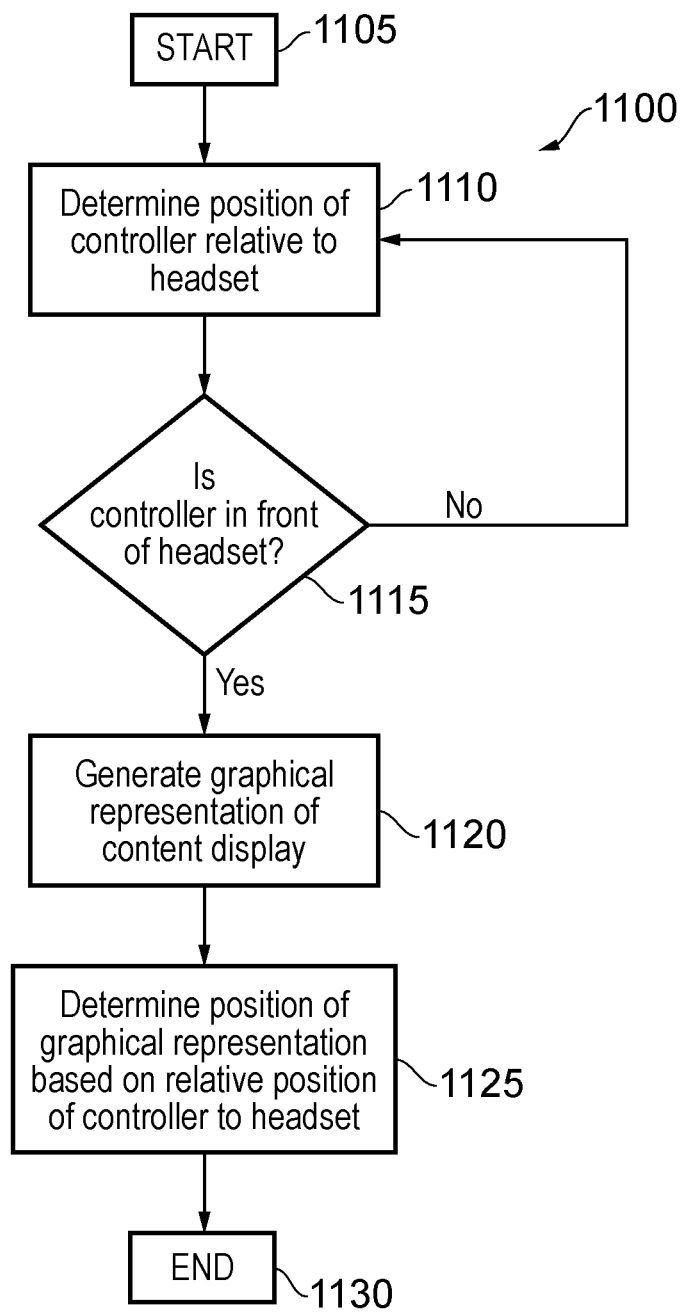
FIG. 11 shows a process 1100 according to embodiments of the disclosure.

FIG. 11 shows a flow chart 1100 explaining the process of FIGS. 3A to 3C. The process starts at step 1105. The controller 805 within the PS4 determines the position of the control unit 110 relative to the headset 105. This is achieved using the headset detector 120. This occurs at step 1110. The controller 805 then checks whether the control unit 110 is located within the field of view of the headset 105. In the event that the control unit 110 is not located in the field of view of the headset 105, the "no" path is followed and the process returns to step 1110.

However, in the event that the control unit 110 is located within the field of view of the headset 105, the "yes" path is followed. This check occurs at step 1115. The process then moves onto step 1120.

At step 1120, the graphical representation of the content display (either the tablet representation or a book representation) is generated by the controller 805. This is step 1120.

The process then moves to step 1125 where the position of the graphical representation in the virtual environment is determined based upon the position of the control unit 110 relative to the headset 105. The process ends at step 1130.

Figure 12:
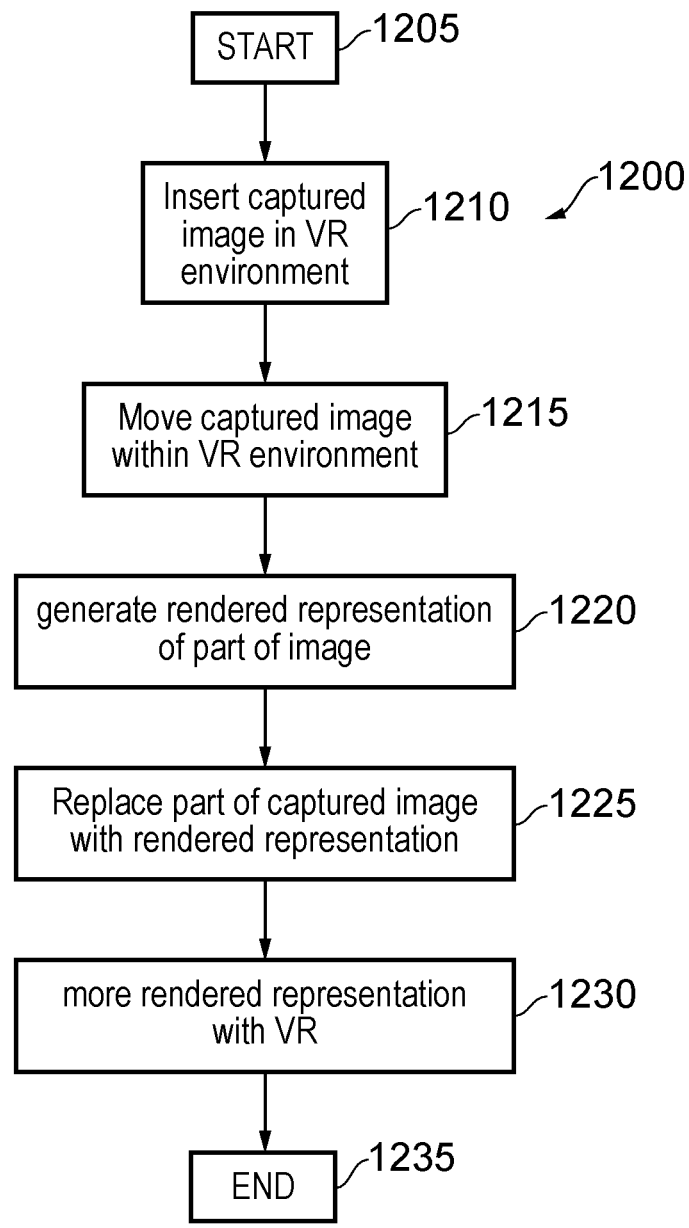
FIG. 12 shows a process 1200 according to embodiments of the disclosure

FIG. 12 shows a flow chart 1200 explaining the process of FIGS. 7A to 7E. The process starts at step 1205. The controller 805 inserts an image which was previously captured and sent over the Internet into the virtual reality environment in step 1210. The captured image is then moved within the virtual reality environment in step 1215. A representation of at least part of the image is generated in step 1220. The part of the captured image which has been generated/rendered in step 1220 is replaced by the rendered/generated part. This is step 1225.

The representation that has been generated/rendered is then moved in step 1230. The process then ends in step 1235.

Minor Modifications

In addition to content being provided on the graphical representation of the tablet, content may be placed on fixed structures within the virtual reality environment. For example, a graphical representation of the in-venue screen may be provided which is fixed to the stadium. The content displayed on this in-venue screen may be the real-world in-venue content provided by the in-venue video feed, or may be selected based on user preferences (such as live sports scores) or provided based on advertising.

The user may also highlight particular players either before or during the match. This is achieved by the user selecting a particular player from a list of players. In this instance, the player may be highlighted in the virtual reality environment by placing a coloured ring or some other highlighting mechanism on or near the player.

The controller 505 may analyse the feeds being presented to it for movement. In the event of little movement within the video feeds for a predetermined time, the process of FIG. 12 may be commenced. In other words, the controller 505 may determine when the amount of movement in the video feeds is less than a predetermined level for a predefined period of time, and in this event, the process of FIG. 12 may be commenced.

Alternatively or additionally, a different celebrity may be rendered into the virtual reality environment. This celebratory may wave to the user, or may tell a joke or the like to entertain the user. This maintains the attention of the user during quiet periods of the match.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

Embodiments of the present technique can generally described by the following numbered clauses:

1. An apparatus for generating a graphical representation of a content display in a virtual reality environment, comprising: controller circuitry configured to determine a position of a device relative to a virtual reality headset in the real world, and when the device is at a predetermined position in front of the virtual reality headset, the controller circuitry is further configured to: generate a graphical representation of a content display in the virtual reality environment, the position of the graphical representation in the virtual reality environment being determined by the real world position of the device in front of the virtual reality headset.

2. An apparatus according to clause 1, wherein the controller circuitry is configured such that the content display displays a plurality of different content, wherein the content display is configured to change the different content in response to a user input on the device.

3. An apparatus according to clause 2, wherein the user input is a swipe on the device.

4. An apparatus according to clause 1 to 3, wherein the position of the graphical representation in the virtual reality environment is fixed in response to a user input.

5. An apparatus according to clause 4, wherein the user input is a gesture, a predetermined movement of the device, a button press on the device or a predetermined sound.

6. An apparatus according to clause 1 to 5, wherein the size of the graphical representation of a content display is changed in dependence on the position of the distance between the virtual reality headset and the device.

7. An apparatus according to clause 1 to 6, wherein the graphical representation of a content display is a tablet or a book.

8. An apparatus according to clause 1 to 7, wherein, in response to a user input, the controller circuitry is configured to: lock the position of the graphical representation of the content display in the virtual reality environment.

9. An apparatus according to clause 8, wherein the controller circuitry is configured, in response to locking the position, a second graphical representation of the content display is created, wherein the position of the second graphical representation of the content display is determined by the real world position of the device in front of the virtual reality headset.

10. An apparatus for generating a graphical representation of a content display in a virtual reality environment, comprising controller circuitry configured to: receive a user input, and in response to the user input, to generate a graphical representation of a content display in the virtual reality environment, the position of the graphical representation of a content display in the virtual reality environment being determined by the real world gaze of a user's eye.

11. An apparatus according to clause 10, wherein the position of the graphical representation of a content display is determined by the dwell time of the gaze of the user's eye.

12. A method of generating a graphical representation of a content display in a virtual reality environment, comprising: determining a position of a device relative to a virtual reality headset in the real world, and when the device is at a predetermined position in front of the virtual reality headset, the method comprises: generating a graphical representation of a content display in the virtual reality environment, the position of the graphical representation in the virtual reality environment being determined by the real world position of the device in front of the virtual reality headset.

13. A method according to clause 12, wherein the content display is configured to display a plurality of different content, wherein the content display is configured to change the different content in response to a user input on the device.

14. A method according to c clause 13, wherein the user input is a swipe on the device.

15. A method according to clause 12 to 14, wherein the position of the graphical representation in the virtual reality environment is fixed in response to a user input.

16. A method according to clause 15, wherein the user input is a gesture, a predetermined movement of the device, a button press on the device or a predetermined sound.

17. A method according to clause 12 to 16, wherein the size of the graphical representation of a content display is changed in dependence on the position of the distance between the virtual reality headset and the device.

18. A method according to clause 12 to 16, wherein the graphical representation of a content display is a tablet or a book.

19. A method according to clause 12 to 16, wherein, in response to a user input, the method comprises locking the position of the graphical representation of the content display in the virtual reality environment.

20. A method according to clause 19, wherein, in response to locking the position, a second graphical representation of the content display is created, wherein the position of the second graphical representation of the content display is determined by the real world position of the device in front of the virtual reality headset.

21. A method of generating a graphical representation of a content display in a virtual reality environment, comprising: receiving a user input, and in response to the user input, generating a graphical representation of a content display in the virtual reality environment, the position of the graphical representation of a content display in the virtual reality environment being determined by the real world gaze of a user's eye.

22. A method according to clause 21, wherein the position of the graphical representation of a content display is determined by the dwell time of the gaze of the user's eye.

23. A computer program product comprising computer readable code which, when loaded onto a computer, configures the computer to perform the method of clause 12 to 22.

The invention claimed is:

1. An apparatus for generating a graphical representation of a content display in a virtual reality environment, comprising:
controller circuitry configured to determine a position of a device relative to a virtual reality headset in the real world,
wherein, when the device is at a predetermined position in front of the virtual reality headset, the controller circuitry is further configured to: generate a graphical representation of a content display in the virtual reality environment, the position of the graphical representation in the virtual reality environment being determined by the real world position of the device in front of the virtual reality headset,
wherein the size of the graphical representation of a content display is changed in dependence on the position of the distance between the virtual reality headset and the device,
wherein, in response to a user input, the controller circuitry is configured to: lock the position of the graphical representation of the content display in the virtual reality environment by fixing the position of the graphical representation with respect to a field of view of the virtual reality headset and, the controller circuitry is further configured, in response to locking the position, to create a second graphical representation of the content display, and
wherein the position of the second graphical representation of the content display is determined by the real world position of the device in front of the virtual reality headset.

2. The apparatus according to claim 1, wherein the controller circuitry is configured such that the content display displays a plurality of different content, wherein the content display is configured to change the different content in response to a user input on the device.

3. The apparatus according to claim 2, wherein the user input is a swipe on the device.

4. The apparatus according to claim 1, wherein the position of the graphical representation in the virtual reality environment is fixed in response to a user input.

5. The apparatus according to claim 4, wherein the user input is a gesture, a predetermined movement of the device, a button press on the device or a predetermined sound.

6. The apparatus according to claim 1, wherein the graphical representation of a content display is a tablet or a book.

7. An apparatus for generating a graphical representation of a content display in a virtual reality environment, comprising controller circuitry configured to: receive a user input, and in response to the user input, to generate a graphical representation of a content display in the virtual reality environment, a position of the graphical representation of a content display in the virtual reality environment with respect to a field of view of the virtual reality headset being determined by a real world gaze of a user's eye.

8. The apparatus according to claim 7, wherein the position of the graphical representation of a content display is determined by the dwell time of the gaze of the user's eye.

9. A method of generating a graphical representation of a content display in a virtual reality environment, comprising:

determining a position of a device relative to a virtual reality headset in the real world, wherein when the device is at a predetermined position in front of the virtual reality headset, the method comprises: generating a graphical representation of a content display in the virtual reality environment, the position of the graphical representation in the virtual reality environment being determined by the real world position of the device in front of the virtual reality headset, wherein the size of the graphical representation of a content display is changed in dependence on the position of the distance between the virtual reality headset and the device, wherein, in response to a user input, the method comprises: locking the position of the graphical representation of the content display in the virtual reality environment by fixing the position of the graphical representation with respect to a field of view of the virtual reality headset and, in response to locking the position, creating a second graphical representation of the content display, wherein the position of the second graphical representation of the content display is determined by the real world position of the device in front of the virtual reality headset.

10. The method according to claim 9, wherein the content display is configured to display a plurality of different content, wherein the content display is configured to change the different content in response to a user input on the device.

11. The method according to claim 10, wherein the user input is a swipe on the device.

12. The method according to claim 9, wherein the position of the graphical representation in the virtual reality environment is fixed in response to a user input.

13. The method according to claim 12, wherein the user input is a gesture, a predetermined movement of the device, a button press on the device or a predetermined sound.

14. The method according to claim 9, wherein the graphical representation of a content display is a tablet or a book.

15. A non-transitory computer program product comprising computer readable code which, when loaded onto a computer, configures the computer to perform the method of claim 9.

16. A method of generating a graphical representation of a content display in a virtual reality environment, comprising:

receiving a user input; and in response to the user input, generating a graphical representation of a content display in the virtual reality environment, a position of the graphical representation of a content display in the virtual reality environment with respect to a field of view of the virtual reality headset being determined by a real world gaze of a user's eye.

17. The method according to claim 16, wherein the position of the graphical representation of a content display is determined by the dwell time of the gaze of the user's eye.

* * * * *